US009850422B2

(12) United States Patent
Lestz et al.

(10) Patent No.: US 9,850,422 B2
(45) Date of Patent: Dec. 26, 2017

(54) HYDROCARBON-BASED FRACTURING FLUID COMPOSITION, SYSTEM, AND METHOD

(71) Applicant: ProStim Labs, LLC, Houston, TX (US)

(72) Inventors: Robert Lestz, Missouri City, TX (US); John F. Thrash, Houston, TX (US); Audis C. Byrd, Big Sandy, TX (US); James H. Junkins, Houston, TX (US)

(73) Assignee: Prostim Labs, LLC, Houston, TX (US)

( * ) Notice: Subject to any disclaimer, the term of this patent is extended or adjusted under 35 U.S.C. 154(b) by 0 days.

(21) Appl. No.: 15/186,153

(22) Filed: Jun. 17, 2016

(65) Prior Publication Data

US 2016/0312108 A1 Oct. 27, 2016

Related U.S. Application Data

(63) Continuation-in-part of application No. 15/179,616, filed on Jun. 10, 2016, now abandoned, which is a continuation-in-part of application No. 14/735,745, filed on Jun. 10, 2015, said application No. 15/179,616 is a continuation-in-part of application
(Continued)

(51) Int. Cl.
| | |
|---|---|
| *E21B 43/26* | (2006.01) |
| *E21B 43/267* | (2006.01) |
| *C09K 8/64* | (2006.01) |
| *C09K 8/80* | (2006.01) |
| *C09K 8/82* | (2006.01) |

(Continued)

(52) U.S. Cl.
CPC ............... *C09K 8/64* (2013.01); *C09K 8/703* (2013.01); *C09K 8/80* (2013.01); *C09K 8/805* (2013.01); *C09K 8/82* (2013.01); *C09K 8/94* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | | | |
|---|---|---|---|---|
| 5,207,953 | A * | 5/1993 | Thorssen | C09K 8/60 252/364 |
| 2011/0092394 | A1 * | 4/2011 | Peng | C07D 213/20 507/102 |

(Continued)

*Primary Examiner* — Doug Hutton, Jr.
*Assistant Examiner* — Charles Nold
(74) *Attorney, Agent, or Firm* — Hulsey, P.C.

(57) ABSTRACT

Systems, compositions, and methods usable to stimulate a formation include a first supply subsystem adapted to provide a first medium to the formation and a pressure subsystem that includes a pump in communication with the first medium to pressurize the first medium to a pressure sufficient to stimulate the formation. Usable media can include non-gelled liquid alkanes, halogenated hydrocarbons, foamed hydrocarbons, a fluidized solid proppant material that behaves as a liquid under threshold conditions, or a liquid material adapted to solidify under threshold conditions. A proppant can be supplied in addition to the first medium when performing fracturing operations. Usable proppant can include materials having a size or density adapted to facilitate buoyancy, hollow materials, composite materials, porous materials, or crystalline materials.

7 Claims, 16 Drawing Sheets

Related U.S. Application Data

No. 14/511,858, filed on Oct. 10, 2014, now abandoned, said application No. 14/735,745 is a continuation-in-part of application No. 14/199,461, filed on Mar. 6, 2014, application No. 15/186,153, which is a continuation-in-part of application No. 14/825,089, filed on Aug. 12, 2015, now abandoned.

(60) Provisional application No. 62/010,302, filed on Jun. 10, 2014, provisional application No. 62/036,297, filed on Aug. 12, 2014, provisional application No. 61/774,237, filed on Mar. 7, 2013, provisional application No. 61/790,942, filed on Mar. 15, 2013, provisional application No. 61/915,093, filed on Dec. 12, 2013, provisional application No. 61/807,699, filed on Apr. 2, 2013, provisional application No. 61/870,350, filed on Aug. 27, 2013, provisional application No. 62/249,777, filed on Nov. 2, 2015, provisional application No. 62/347,708, filed on Jun. 9, 2016, provisional application No. 62/347,702, filed on Jun. 9, 2016, provisional application No. 62/036,284, filed on Aug. 12, 2014, provisional application No. 61/889,187, filed on Oct. 10, 2013.

(51) Int. Cl.
*C09K 8/70* (2006.01)
*C09K 8/94* (2006.01)

(56) References Cited

U.S. PATENT DOCUMENTS

| | | | |
|---|---|---|---|
| 2012/0149610 A1* | 6/2012 | Parse | C09K 8/80 507/273 |
| 2013/0306322 A1* | 11/2013 | Sanborn | E21B 43/26 166/308.1 |
| 2014/0000899 A1* | 1/2014 | Nevison | E21B 43/26 166/308.1 |

* cited by examiner

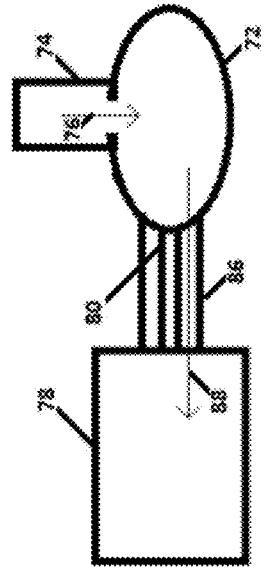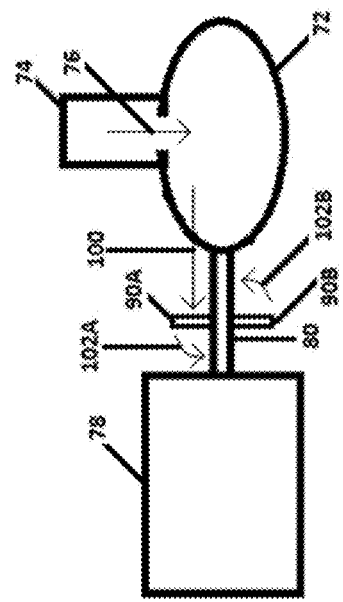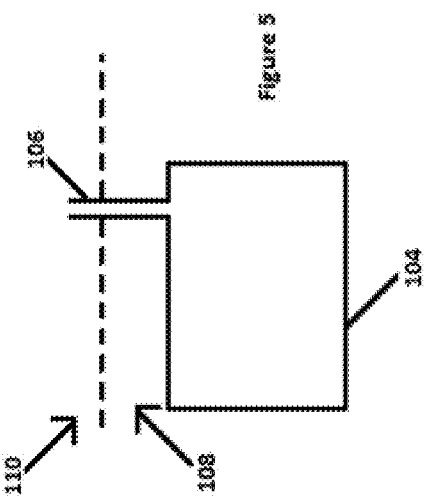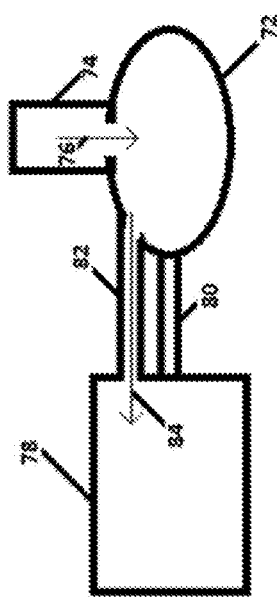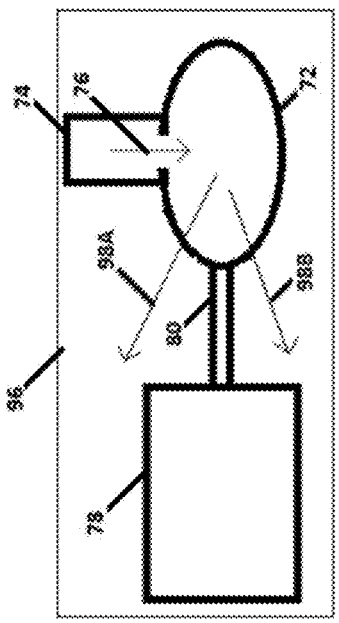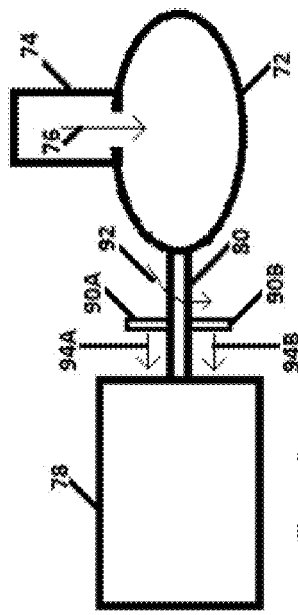

HYDROCARBON-BASED FRACTURING FLUID COMPOSITION, SYSTEM, AND METHOD

CROSS-REFERENCE TO RELATED APPLICATIONS

This application is related to:
U.S. Provisional Patent Application Ser. No. 62/010,302, filed Jun. 10, 2014;
U.S. Provisional Patent Application Ser. No. 62/036,297, filed Aug. 12, 2014;
U.S. application for patent application Ser. No. 14/199,461, filed Mar. 6, 2014;
U.S. application for patent application Ser. No. 14/511,858, filed Oct. 10, 2014;
U.S. Provisional Patent Application Ser. No. 61/774,237, filed Mar. 7, 2013;
U.S. Provisional Patent Application Ser. No. 61/790,942, filed Mar. 15, 2013;
U.S. Provisional Patent Application Ser. No. 61/807,699, filed Apr. 2, 2013;
U.S. Provisional Patent Application Ser. No. 61/870,350, filed Aug. 27, 2013;
U.S. Provisional Patent Application Ser. No. 61/915,093, filed Dec. 12, 2013;
U.S. application for patent application Ser. No. 14/735,745, filed Jun. 10, 2015;
U.S. application for patent application Ser. No. 14/511,858, filed Oct. 10, 2014;
U.S. application for patent application Ser. No. 14/825,089, filed Aug. 12, 2015;
U.S. application for patent application Ser. No. 15/179,616, filed Jun. 10, 2016;
U.S. application for Patent Application Ser. No. 62/249,777, filed Nov. 2, 2015;
U.S. application for Patent Application Ser. No. 62/347,708, filed Jun. 9, 2016; and
U.S. application for patent application Ser. No. 62/347,702, filed Jun. 9, 2016.
Each of the fore mentioned applications are incorporated by reference in their entireties.

The application claims priority to:
U.S. Provisional Patent Application Ser. No. 62/010,302, filed Jun. 10, 2014;
U.S. Provisional Patent Application Ser. No. 62/036,284, filed Aug. 12, 2014;
U.S. Provisional Patent Application Ser. No. 62/036,297, filed Aug. 12, 2014;
U.S. application for patent application Ser. No. 14/199,461, filed Mar. 6, 2014;
U.S. application for patent application Ser. No. 14/511,858, filed Oct. 10, 2014;
U.S. Provisional Patent Application Ser. No. 61/774,237, filed Mar. 7, 2013;
U.S. Provisional Patent Application Ser. No. 61/790,942, filed Mar. 15, 2013;
U.S. Provisional Patent Application Ser. No. 61/915,093, filed Dec. 12, 2013;
U.S. Provisional Patent Application Ser. No. 61/807,699, filed Apr. 2, 2013;
U.S. Provisional Patent Application Ser. No. 61/870,350, filed Aug. 27, 2013;
U.S. application for patent application Ser. No. 14/735,745, filed Jun. 10, 2015; and
U.S. application for patent application Ser. No. 14/511,858, filed Oct. 10, 2014;
U.S. application for patent application Ser. No. 14/825,089, filed Aug. 12, 2015;
U.S. application for patent application Ser. No. 15/179,616, filed Jun. 10, 2016;
U.S. application for Patent Application Ser. No. 62/249,777, filed Nov. 2, 2015;
U.S. application for Patent Application Ser. No. 62/347,708, filed Jun. 9, 2016; and
U.S. application for Patent Application Ser. No. 62/347,702, filed Jun. 9, 2016.

FIELD

Embodiments usable within the scope of the present disclosure relate, generally, to systems, methods, devices, and compositions usable within a wellbore, and more to systems and methods for fracturing a subterranean formation to stimulate production (e.g., of hydrocarbons) therefrom. More specifically, this disclosure relates to systems and methods for fracturing a formation using fracturing fluids comprising hydrocarbon based fracturing fluids used in combination with highly transportable proppant materials for use in formations with relatively low formation permeability, such as shale formations.

BACKGROUND

To stimulate and/or increase the production of hydrocarbons from a well, a process known as fracturing (colloquially referred to as "fracing") is performed. In brief summary, a pressurized fluid—often water—is pumped into a producing region of a formation at a pressure sufficient to create fractures in the formation, thereby enabling hydrocarbons to flow from the formation with less impedance. Solid matter, such as sand, ceramic beads, and/or similar particulate-type materials, can be mixed with the fracturing fluid, this material generally remaining within the fractures after the fractures are formed. The solid material, known as proppant, serves to prevent the fractures from closing and/or significantly reducing in size following the fracturing operation, e.g., by "propping" the fractures in an open position. The presence of open, propped fractures provides a beneficial contrast between the permeability in the fracture versus that in the adjacent subterranean reservoir. This contrast provides for a highly conductive pathway through which reservoir fluids may travel, thus enhancing the productivity of the well.

Fracturing using aqueous fluids is often undesirable due to the negative effects of water on formations. For example, clays and other components forming the structure of a formation can swell when exposed to water, while salts and other formation components may dissolve. Accordingly, exposure to a significant quantity of water can destabilize a formation.

Furthermore, use of water and other aqueous fluids also generates issues regarding disposal. Specifically, aqueous fracturing fluid recovered from a well (e.g., subsequent to a fracturing operation) contains various wellbore fluids and other chemicals (e.g., additives to facilitate fracturing using the fluid), and as such, the recovered fracturing fluid must be collected and stored at the surface and disposed of in an environmentally acceptable manner, as required by numerous regulations. Such a process can add considerable time and expense to a fracturing operation, especially when considering the enormous quantities of liquid required to perform such operations.

Non-aqueous fracturing fluids have been used as an alternative to water based ones. One such successful class includes hydrocarbon-based fluids (e.g., crude/refined oils, methanol, diesel, natural-gas condensate, liquefied petroleum gas (LPG) and/or other aliphatic or aromatic compounds). Hydrocarbon-based fracturing fluids are inherently compatible with most reservoir formations, being generally non-damaging to formations while creating acceptable fracture geometry. However, due to the flammability and high vapor pressure of many hydrocarbon-based fluids, enhanced safety preparations and equipment are necessary when using such fluids for wellbore operations. Additionally, many hydrocarbon-based fluids are volatile and/or otherwise unsuitable for use at wellbore temperatures and pressures, while lacking density and/or viscosity sufficient to effectively transport many types of proppant throughout the length of the fracture. As such, it is common practice to use chemical additives (e.g., gelling agents, viscosifiers, etc.) to alter the characteristics of the fluids. An exemplary system describing use of liquid petroleum gas is described in U.S. Pat. No. 8,408,289, which is incorporated by reference herein in its entirety. Use of chemical additives generates waste and disposal issues similar to those encountered when performing fracturing operations using aqueous fluids.

An exemplary hydrocarbon based fracturing fluid would be LPG/Propane, which has a surface tension about ten (10) times less than that of water, and a viscosity about 8 times less than water.

Independent of the type of fracturing fluid and proppant used, a fracturing operation typically requires use of one or more high pressure pumps to pressurize the fracturing fluid that is pumped into a formation, as well as to transport fluid and/or proppant toward the wellbore. The passage of proppant through a pump can damage the pump through an erosive process, especially in the absence of a significant quantity of liquid in the slurry. Great care must often be taken when controlling the proportions of fluid and proppant used to create a slurry to ensure the creation of a mixture that is non-damaging to pumps and other system components, compatible with the formation, is suitable for use within the wellbore (e.g., appropriate specific gravity, stability at wellbore temperatures and pressures, etc.), and to ensure that the proppant is properly transported to and placed in the fractures.

Additionally, pumps and other such equipment are conventionally driven/powered using diesel engines, which can be responsible for significant quantities of noise, emissions, maintenance, and expense at a worksite, and which require the handling of volatile fluids to fuel and operate. Electric drive systems have been contemplated as an alternative to diesel engines; however, such systems require numerous pieces of equipment, extensive cabling and/or similar conduits, and typically utilize on-site power generation, such as a natural gas turbine. Use of turbine prime movers and similar equipment may be unsuitable when utilizing fracturing fluids that include flammable components. An exemplary electrically powered system for use in fracturing underground formations is described in published United States Patent Application 2012/0255734, which is incorporated by reference herein in its entirety.

SUMMARY

A need exists for systems and methods for fracturing and/or stimulating a subterranean formation that can overcome issues of formation damage/compatibility, flammability, proppant delivery, and/or power supply.

Embodiments usable within the scope of the present disclosure include systems and methods usable for stimulating a formation (e.g., by forming fractures therein), by providing a first medium to the formation via a first supply subsystem, and a pressure subsystem comprising a pump usable to pressurize the first medium to a pressure sufficient to stimulate the formation. The term "first medium" is used herein to refer, generally, to any type of solid, liquid, gas, or combination thereof able to be flowed, e.g., through a conduit, from a source toward a formation, such through use of one or more pumps or other sources of motive force to move the medium and/or pressurize the medium for performance of a fracturing operation.

For example, in an embodiment, the first medium can include a liquid alkane, and in more specific embodiments, a non-gelled liquid alkane. The term "non-gelled" is used, herein to refer to a medium lacking conventional gellants and/or gelling agents. While in various embodiments, a non-gelled liquid alkane can be used in a chemical-free (e.g., pure) form. It should be understood that, if desired, surfactants and/or other types of viscosity modification can be used to modify the first medium without departing from the scope of the present disclosure.

In an embodiment, the first medium can include a halogenated hydrocarbon. While alkanes and other hydrocarbons can generate various concerns and/or difficulties due to their flammability, halogenated hydrocarbons are significantly less flammable or in many cases, non-flammable. Exemplary halogenated hydrocarbons usable within the scope of the present disclosure can include, without limitation, 1,1,1,3,3,3 hexafluoropropane; 1,1,1,2,3,3,3 heptafluoropropane; 1-methoxyheptafluoro propane; 2,3,3,3-tetrafluoropropene; 1,3,3,3-tetrafluoropropene; 1,1,1,2,2,3,4,5,5,5-decafluoro-3-methoxy-4-trifluoromethyl-pentane; 1,1,1,4,4,4-hexafluoro-2-butene-1-methoxy; 1,1,1,2-tetrafluoroethane; or combinations thereof. In various embodiments, the first medium can include a halogenated alkene, a halogenated ether, a halogenated olefin, or combinations thereof. The halogenated hydrocarbon can constitute all or a portion of the first medium. For example, the first medium can include a non-halogenated hydrocarbon mixed with the halogenated hydrocarbon (e.g., typically 5% or less of the non-halogenated hydrocarbon by volume, though other concentrations can be used without departing from the scope of the present disclosure), such that although the first medium contains flammable components, the halogenated hydrocarbon reduces the overall flammability of the first medium.

In an embodiment, the first medium can include a foamed hydrocarbon (e.g., an alkane or another type of hydrocarbon. A foamed hydrocarbon can include any type of hydrocarbon usable, e.g., as a fracturing fluid, mixed with a quantity of inert gas sufficient to "foam" the hydrocarbon (e.g., from 45% to 90% inert gas by volume). In an embodiment, the hydrocarbon can be mixed with a fluorosurfactant to promote foaming of the first medium.

In other embodiments, the second medium may not include a "fluid" in the conventional sense. For example, embodiments usable within the scope of the present disclosure can include use of a fluidized solid proppant, e.g., a solid material adapted to follow, substantially free of liquid, in the manner of a liquid when flowed at a threshold pressure and/or velocity, while behaving in the manner of a solid at pressures and/or velocities less than the threshold. In an exemplary embodiment, solid particulate matter, such as sand, ceramic, glass, clay, gravel, and/or other similar solid particles, can be mixed with a friction-reducing additive, such that the particles of solid matter can flow relative to one another. Without limitation, usable friction-reducing additives could include molybdenum disulfide, carbon black, graphite, fumed silica, epoxy matrix resin nanoparticles, glass bubbles, or combinations thereof. For example, the friction-reducing additive can coat and/or otherwise be interspersed between particles of solid matter, such that the solid matter can pass and/or flow relative to one another with reduced friction, e.g., behaving in a manner similar to a liquid once sufficient pressure and/or velocity is imparted thereto.

In an embodiment, a fluidized solid proppant could include a material capable of flowing in the manner of a liquid at a threshold pressure and/or velocity in the absence of an additive (such as a friction-reducing component). For example, glass bubbles and/or microspheres could be used as a fluidized solid proppant independent of or in addition to a friction-reducing additive. Alternatively or additionally, one or more solid components adapted to flow in the manner of a liquid when vibrated or pulsed could be used; for example, sand and/or similar particulate matter can be flowed toward a formation if vibrated and/or pulsed at a suitable frequency. In an embodiment, a pneumatic conveying system can be used to vibrate and/or pulse the particulate matter to facilitate movement thereof.

To facilitate intermixing of components of a fluidized solid proppant and/or a reduction in friction thereof, in various embodiments a quantity of liquid (e.g., a lubricant, a fracturing fluid, etc.) can be mixed with the fluidized solid proppant; however, a quantity insufficient to form a slurry with the proppant can be used due to the fact that the proppant, itself, can be flowed toward the formation without slurrying the proppant.

In an embodiment, the first medium can include a liquid material adapted to solidify at a threshold temperature (e.g., a foam material), such that the medium can be flowed into the formation as a liquid, then solidified (e.g., into a porous, solid material) after reaching fractures in the formation, enabling the solidified material to function as proppant. Depending on the ambient formation conditions (e.g., temperature), a cooling fluid could be injected to prepare the formation to receive the liquid material without premature solidification thereof.

In an embodiment, a pipeline in communication with a remote source can be used to supply the first medium to the formation directly, in addition to or in lieu of one or more on-site storage vessels.

In combination with the fracturing fluid, a second supply subsystem can be used to provide a second medium that includes a proppant (potentially with lubricants and/or other additives) to the formation.

In an embodiment, the fracturing fluid can include a non-gelled liquid alkane, as described above, and the proppant can comprise a specific gravity, a size (e.g., a diameter) or combinations thereof adapted to provide the proppant with a substantially neutral or positive buoyancy in the fracturing fluid. As used herein, the term "substantially neutral buoyancy" can include a neutral, positive, or negative buoyancy in which the proppant does not settle at a rate sufficient to prevent use of the fracturing fluid and proppant in a fracturing operation. A substantially neutrally buoyant proppant can have a specific gravity of 1.5 or less, and in an embodiment, the proppant can have a specific gravity of 1.1 or less. Alternatively or additionally, in an embodiment, proppant particles could have a diameter of 105 microns or less to facilitate buoyancy thereof.

In an embodiment, the proppant can include a hollow material, such as glass bubbles, cenospheres, microspheres, and/or other similar materials having a structure sufficient to function as proppant while remaining generally buoyant in a fracturing fluid. In an embodiment, the proppant can include a composite material, such as a syntactic foam. In an embodiment, the proppant can include a porous material, such as an aerogel, a resin-coated aerogel, a resin-coated pumice, a syntactic foam or other type of foamed material, or combinations thereof. As used herein, a "porous material" can include particles having cylindrical and/or tubular structures (e.g., having an axial bore) through which fluid can pass. In a further embodiment, the proppant can include a porous material that is permeable to reservoir fluids, such as a filter material that permits passage of the fluid into and through particles of proppant, while the structure of the material enables the material to function as proppant. In an embodiment, the proppant material can include a crystalline material, such as zircon or other similar crystalline materials.

In an embodiment, a venturi nozzle can be positioned in communication with a flowpath of the fracturing fluid to reduce a pressure thereof. In doing so, proppant from the second supply subsystem can be drawn into the flowpath of the fracturing fluid. The venturi nozzle can include an elastomeric nozzle adapted to adjust (e.g., self-adjust) to provide a substantially constant pressure drop across the nozzle independent of the flow rate and/or conditions of the fracturing fluid and/or the proppant.

While embodiments usable within the scope of the present disclosure can be powered using on-site using reciprocating engines (e.g., diesel engines), coupled with turbine generators and/or similar power systems, in an embodiment, one or more system components can be configured for use with electrical power. For example, the pressure subsystem can include an electric-powered driver (e.g., an electric motor or similar source of force) in communication with and actuating the pump, while an electrical power source powers the electric-powered driver. In an embodiment, a turbine generator (e.g., a natural gas turbine or similar source) can be used to provide power to an electric motor, which in turn drives the pump. Alternatively or additionally, a grid-based power source can be used to power the electric-powered driver. In an embodiment, an electric-powered driver can be configured for selective and/or simultaneous operation using a grid-based or an on-site power source. Where a grid-based power sourced is used, in an embodiment, one or more additional transformers can be used to convert power from the grid-based power source to a desired voltage. In use, a single pump can be actuated using a single electric-powered driver or multiple electric-powered drivers, and multiple pumps can be actuated using a single electric-powered driver or multiple electric-powered drivers. Similarly, a single power source can power one or multiple electric-powered drivers, or one or multiple electric-powered drivers can be powered by multiple power sources.

In various embodiments, use of air moving devices may be incorporated to control the concentration of vapors (e.g., hydrocarbon-based gasses and/or similar components) proximate to pumps and/or other system components. For example, when using propane as a fracturing fluid, the accumulation of propane proximate to the pump could create a flammable condition (e.g., at a propane concentration of approximately 2.2% to 9.5% in air), while the continuous movement of air proximate to the pump would prevent accumulation of flammable components at a concentration sufficient for ignition. In an embodiment, an electric motor or similar electric-powered driver can include a fan, blower, or other type of air moving device associated therewith, and placement of the driver and/or air moving device can be selected such that the air moving device flows air proximate to the pump for dispersing gas therefrom. In an embodiment, an enclosed conduit can extend between the electric-powered driver and the pump, such that air form the air moving device flows from the driver to the pump via the conduit. Alternatively or additionally, an electric powered driver and pump can be enclosed within a single housing, such that air from the air moving device flows proximate to the pump.

In various embodiments, a drive shaft extending between the electric-powered driver and the pump can have protrusions (e.g., blades, fins, etc.) extending therefrom, such that as the air moving device flows air into contact with the protrusions, motive force is provided to the drive shaft. Alternatively, movement of the drive shaft can, itself, be used to flow air (e.g., via the protrusions) to circulate air proximate to the pump, in addition to or in lieu of an air-moving device associated with the electric-powered driver.

BRIEF DESCRIPTION OF THE DRAWINGS

In the detailed description of various embodiments usable within the scope of the present disclosure, presented below, reference is made to the accompanying drawings, in which:

FIG. 2A depicts a diagrammatic side view of an embodiment of a motor engaged with a pump, usable within the scope of the present disclosure.

FIG. 2B depicts a diagrammatic side view of an embodiment of a motor engaged with a pump, usable within the scope of the present disclosure.

FIG. 2C depicts a diagrammatic side view of an embodiment of a motor engaged with a pump, usable within the scope of the present disclosure.

FIG. 3 depicts a diagrammatic side view of an embodiment of a motor engaged with a pump, usable within the scope of the present disclosure.

FIG. 4 depicts a diagrammatic side view of an embodiment of a motor engaged with a pump, usable within the scope of the present disclosure.

FIG. 5 depicts a diagrammatic side view of an embodiment of a variable frequency drive usable within the scope of the present disclosure.

One or more embodiments are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description herein is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood the drawings are intended illustrate and plainly disclose presently preferred embodiments of the invention to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 1:
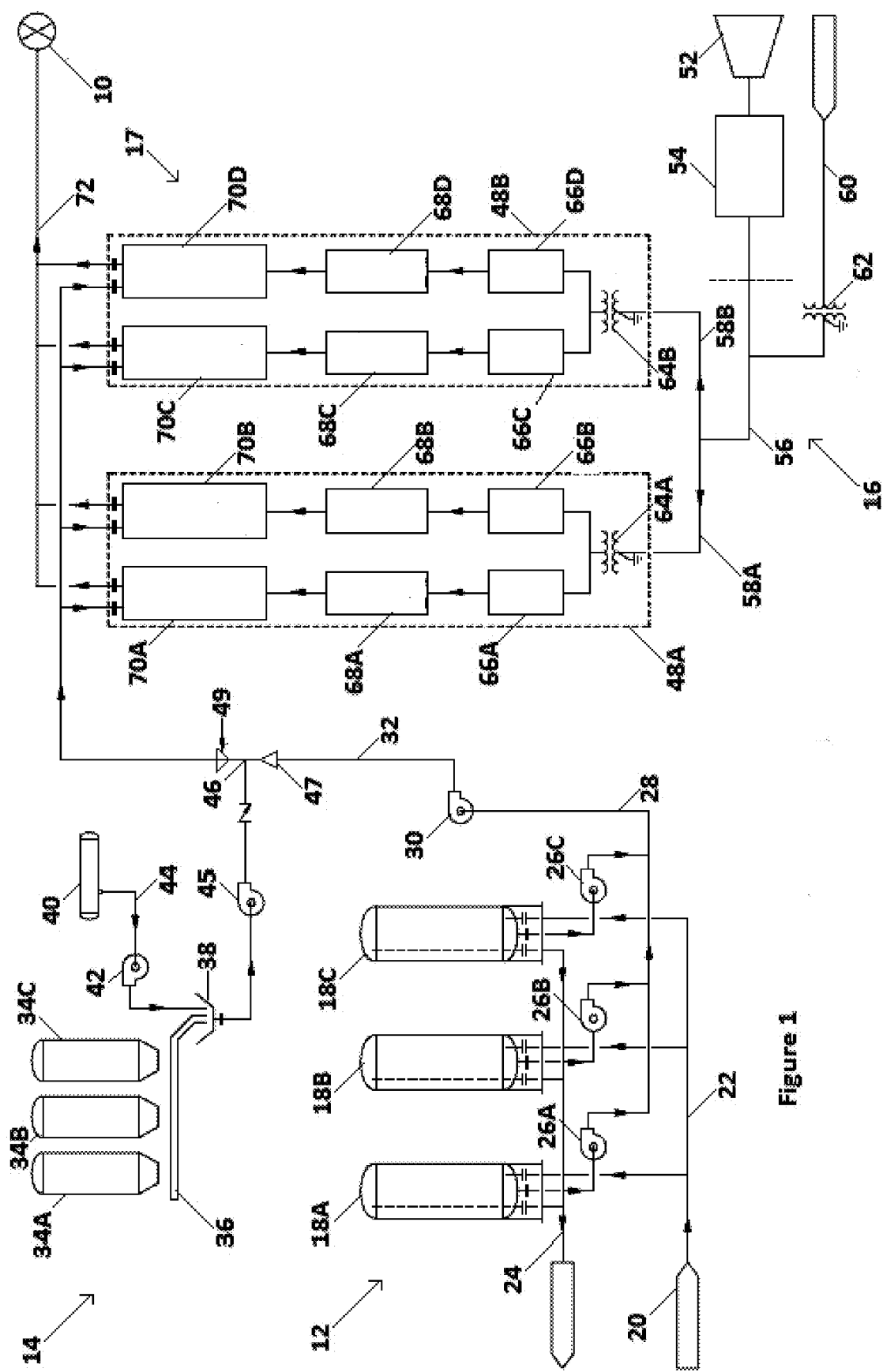
FIG. 1 depicts a diagram of an embodiment of a system usable within the scope of the present disclosure.

FIG. 1 depicts an embodiment of a system usable to inject a fluid under pressure into a well (10). For example, the depicted system can be used to stimulate production (e.g., of hydrocarbons) by forming fractures in the wellbore formation through the provision of a pressurized fracturing fluid into the well (10), mixed with proppant (e.g., solid particulate matter) to maintain and/or support the fractures while permitting the flow of hydrocarbons or other fluids from the formation into the wellbore and toward the surface.

Conceptually, FIG. 1 subdivides the depicted system into a first subsystem—a fluid addition subsystem (12) for providing fracturing fluid or a similar first medium to the well (10), a second subsystem—a proppant addition subsystem (14) for providing proppant or a similar second medium into the fracturing fluid, a power subsystem (16) for providing power to one or more components of the system, and a pumping subsystem (17) for pressurizing fluid for injection into the well (10).

It should be understood that the number, type, and arrangement of components shown in FIG. 1 is only one exemplary embodiment, and that the depicted illustration is diagrammatic, intended to conceptually depict one embodiment of the present system. As such, it should be noted that any number, type, and arrangement of identical or similar components could be used without departing from the scope of the present disclosure. Further, while the depicted embodiment includes multiple subsystems (12, 14, 16, 17) used in combination, it should be understood that in various embodiments, the fluid addition subsystem (12) could be used in the absence of the other subsystems (14, 16, 17) and/or in combination with conventional systems and/or components. Similarly, the proppant addition subsystem (14) and the pumping and power subsystems (16, 17) could be used independently or in combination with conventional systems and/or components without departing from the scope of the present disclosure.

The depicted fluid addition subsystem (12) includes a plurality of tanks (18A, 18B, 18C) and/or other types of vessels usable to contain one or more fluid media usable as a fracturing fluid (e.g., to carry proppant to the well (10) and/or to form fractures in the underlying formation when pressurized). While the depicted embodiment includes tanks (18A, 18B, 18C) usable to contain liquid propane, or other alkanes, it should be understood that various embodiments of the present disclosure can include use of various types of media usable in fracturing operations, as described above.

Alkanes and other hydrocarbons are miscible with the hydrocarbons found in subterranean formations. Fracturing fluids comprising predominately hydrocarbons with high vapor pressures (e.g. Reid vapor pressures between the range of 2 and 200 PSIG) will mix with the hydrocarbon compounds native to the formation and will thereby reduce the viscosity of the native formation oil, and may even vaporize the mixture of fracturing fluid in the presence of natural gas, which results in increased recovery from the formation. This capability is drastically different from the interaction between aqueous fracturing fluids and hydrocarbons native to a formation, which are generally hydrophobic, and will actively resist mixing with water based fracturing fluids (like oil and water).

High vapor pressure hydrocarbons may penetrate into small crevices in the structure of the formation, which may assist with creating more complicated fracture geometries within the formation than other fracturing fluids that are less capable of such penetration, such as when compared to aqueous fracturing fluids.

The high vapor pressure hydrocarbons may be able to penetrate into the structure of the formation (rock, clay, etc.) and may physically combine with any native hydrocarbons contained therein, thereby increasing the possibility of their extraction. This increased ability for a hydrocarbon-based fracturing fluid's ability to leakoff into the formation may assist with the completeness of packing of the formation with any proppant materials being transported by the hydrocarbon based fracturing fluid.

Hydrocarbons tend to be hydrophobic. Water, which is not miscible with most of the hydrocarbon compounds found in subterranean formations, can be imbibed by the structure of the formation through capillary action and may create a damage area that acts as a boundary that can inhibit the transportation of hydrocarbons through those channels and thereby impede hydrocarbon extraction from the areas around the immediate area of the fracture.

Hydrocarbon-based fracturing fluids, unlike water or aqueous based fracturing fluids, are unlikely to react with the compounds found in subterranean formations in a way other than that which occurs therein naturally. Chemical interactions between water or additive containing fracturing fluids and compounds in the formation may result in chemical changes to the substances, which can cause the formation of scale inside of the formation, which may reduce the total hydrocarbon extraction potential of the formation.

The characteristics of high vapor pressure hydrocarbon based fracturing fluids also suggest that materials with high vapor pressures would be less capable of transporting proppants than aqueous based fracturing fluids or fracturing fluids with chemically enhanced viscosities. Therefore, it is important to pair suitable proppants with such high vapor pressure fracturing fluids in order to achieve the desired transport and packing of the proppant throughout the fracture.

Because chemicals with high vapor pressures tend to vaporize when not at high pressures it may be necessary to provide pumping systems that are maintained at high pressures. This can increase the complexity, cost, and hazards involved in the fracturing system layout.

The use of alkanes as a fracturing fluid may also reduce the likelihood that there would be a change in the material of the formation. When water is introduced to an environment in which it interacts with materials like clay there is a mechanical change in the characteristics of the clay which encourage several actions that may not be desired by the operator. First, the increased water saturation would mechanically weaken the clay material, which would then increase the likelihood of embedding proppant particulates into the structure of the formation. Additionally, the water-logged clay may swell, which could result in the blocking of the of oil and gas flowpaths, and will cause the formation to be more susceptible to self-healing (or automatically closing/sealing cracks that have been propagated through the material during the fracturing process). By utilizing alkanes as a fracturing fluid instead of water one would reduce the likelihood of these undesired mechanical interactions with the material of a formation.

Chemicals with high vapor pressures tend to have low viscosities while in the liquid state, and are more likely to vaporize at low pressures. These characteristics allow for easier transportation of such fluids through materials with lower permeability (e.g. permeability less than 5 md). This is due to the fact that formations with high formation permeability already have pore sizes that would allow for effective transport of viscous fluids, such as aqueous fracturing fluids, thereby obviating some of the benefits provided by the use of high vapor pressure hydrocarbon-based fracturing fluids that would be present in low permeability formations.

The high transportability of high vapor pressure hydrocarbons provides the additional benefit of a high recovery rate. Fracturing fluids based on such high vapor pressure hydrocarbons would be able to be easily recovered from the formations into which they had been injected. This may prove highly beneficial since an operator could stimulate a formation, extract the hydrocarbons native to the formation and the injected hydrocarbons, refine the effluent from the formation to separate out the initial fracturing fluid hydrocarbons, and then use them to stimulate another formation with minimal loss of materials.

While gelled liquid petroleum gas has been used in fracturing fluids to minimize damage to formations, driven by pressure applied using inert gas (e.g., nitrogen), as described in U.S. Pat. No. 8,408,289, incorporated by reference above, embodiments usable within the scope of the present disclosure can include use of liquid propane and/or other alkanes, without the addition of gellants or other chemical additives. Additionally, to reduce or eliminate the flammability of the hydrocarbon-based fracturing fluid, in an embodiment, a halogenated hydrocarbon can be present, alone or in combination with non-halogenated hydrocarbons. For example, 1,1,1,2,3,3,3-Heptafluoropropane, or a similar halogenated hydrocarbon compound composed of an aliphatic or aliphatic derivative (e.g., ethers and/or olefins) with one or more halogen elements (e.g., fluorine, bromine, etc.) could be present in the fracturing fluid, such that the resulting fluid is fire retardant or non-flammable. Additionally, it should be understood that heptafluoropropane is referenced as an individual exemplary embodiment; hydrofluoroalkenens, hydrofluoroethers, and other types of halogenated compounds can also be used without departing from the scope of the present disclosure. It is also noted that, use of halogenated hydrocarbons can provide additional beneficial properties beyond non-flammability, due in part to the higher fluid density and lower surface tension and viscosity of the halogenated compounds compared to non-halogenated hydrocarbons. Exemplary halogenated hydrocarbons usable within the scope of the present disclosure can include, without limitation: 1,1,1,3,3,3 hexafluoropropane; 1,1,1,2,3,3,3 heptafluoropropane; 1-methoxyheptafluoro propane; dodecafluoro-2-methylpentane-3-one; 2,3,3,3-tetrafluoropropene; 1,3,3,3-tetrafluoropropene; 1,1,1,2,2,3,4,5,5,5-decafluoro-3-methoxy-4-trifluoromethyl-pentane; 1,1,1,4,4,4-hexafluoro-2-butene; 1-methoxy-1,1,1,2-tetrafluoroethane; or combinations thereof. Further, any manner of halogenated ether, alkene, and/or olefin, can be used without departing from the scope of the present disclosure.

In other embodiments, the fracturing fluid can include a foamed hydrocarbon (e.g., having a quantity of gas mixed therewith). In such embodiments, foamable hydrocarbons (including a foaming agent) can be added downstream or stored in the tanks (18A, 18B, 18C), and/or a gas source (not shown) (e.g., a pressurized gas source) can be configured to inject and/or mix gas downstream of the high pressure pumps (17), into the flowpath prior to entering the wellhead (10). A fluorosurfactant can be provided in the tanks (18A, 18B, 18C), in the gas, and/or from a separate source to facilitate stabilization of the foamed hydrocarbon.

In other embodiments, the fracturing fluid can include or have added to it a fluidized solid proppant material, as described above. Fluidized solid proppant can include solid particulate matter (e.g., sand, ceramic, glass, clay, gravel, etc.), mixed with a solid or liquid friction-reducing additive (e.g., molybdenum disulfide, carbon black, graphite, fumed silica, epoxy matrix resin nanoparticles, glass bubbles, and/or silicone lubricants), to enable the solid material to flow in the manner of a liquid under sufficient pressure to impart movement thereto, while behaving in the manner of a solid in the absence of such ambient conditions. As such, a fluidized solid proppant can be flowed, substantially in the absence of liquid (e.g., a quantity of liquid insufficient to form a slurry therewith), into a formation for performance of a fracturing operation, then permitted to settle and/or remain within the fractures via a cessation of pressure applied from the surface. In various embodiments, the fluidized solid proppant can include solid material (e.g., sand or similar particulate matter) that can flow in the manner of a liquid when vibrated and/or pulsed (e.g., using a pneumatic conveyance system to pulse air and/or other fluids through the proppant), with or without the addition of a friction-reducing additive.

In various embodiments, fluidized solid proppant can include materials that flow in the manner of a liquid under a threshold pressure in the absence of a friction-reducing additive. For example, glass bubbles or similar microspheres or other types of particulate matter having a size, shape, surface feature, and/or other characteristic that reduces or inhibits frictional interactions with adjacent particles.

In an embodiment, the tanks (18A, 18B, 18C) can contain a liquid adapted to solidify under threshold conditions (e.g., temperature), such that the liquid can be flowed into the well (10) until it reaches a fracturing zone, then allowed to solidify within fractures. To facilitate use of such a material, the well (10) can be pre-treated using a fluid to at least temporarily cool the formation prior to flowing the liquid into the well (10), such that the material does not solidify prematurely. In embodiments where a fluidized solid proppant and/or a liquid/foamed solidifying material is used, it should be understood that the proppant supply subsystem (14) can be omitted, if desired.

The tanks (18A, 18B, 18C) are shown in communication with a fluid source (20) for supplying a first medium (e.g., propane, alkanes, and/or other types of fracturing fluid) thereto via a fill line (22). A vent line (24) is also usable, e.g., to relieve pressure from the tanks (18A, 18B, 18C) and/or otherwise facilitate flow thereto and therefrom. Each tank (18A, 18B, 18C) is shown in communication with an associated pump (26A, 26B, 26C) (e.g., a booster pump), usable to draw fracturing fluid therefrom and flow the fluid toward the well (10) via a conduit (28). A secondary fluid booster pump (30) is shown for further driving the fluid toward the well (10), through a low pressure region (32) of the conduit. While FIG. 1 depicts each tank (18A, 18B, 18C) having a respective associated pump (26A, 26B, 26C) associated therewith, and a secondary booster pump (30) to further drive the fluid, it should be understood that in various embodiments, a secondary pump may be omitted, a single pump could be used to draw fluid from multiple tanks, multiple pumps could be used to draw fluid from a single tank, or use of pumps could be omitted. In an embodiment, gravity, vapor pressure, and/or pressure applied to the tanks (18A, 18B, 18C) and/or the contents thereof using external sources could be used to drive fracturing fluid toward the well (10) in lieu of pumps.

The depicted proppant addition subsystem (14) includes a plurality of proppant storage vessels (34A, 34B, 34C) (e.g., silos or another type of tank and/or container), positioned in association with a conveyor (36), which can include one or more conveyor belts, chutes, slides, pipes, or other types of conduits and/or means of conveyance usable to transport proppant from the vessels (34A, 34B, 34C) toward a hopper (38) or similar type of container. Use of vertically oriented proppant storage vessels, such as silos, can enable gravity and/or the weight of the proppant to drive proppant from the containers toward the conveyor (36) and/or toward the well (10), while also reducing the footprint presented by the containers. One exemplary proppant storage container can include an associated transportation trailer. Proppant within the vessels (34A, 34B, 34C) can include any manner of small and/or particulate solid matter usable to retain and/or support fractures in a formation, such as sand, glass or clay beads, gravel, or other similar types of material and or particulate matter, such as crystalline material (e.g., zircon) and/or hollow glass particles (e.g., glass bubbles/microspheres), among other possible alternatives.

Depending on the type of fracturing fluid used the proppant within the vessels (34A, 34B, 34C) can have characteristics selected to facilitate buoyancy and/or transport within the fluid. For example, the proppant can be provided with a specific gravity of less than 1.5 and in an embodiment, less than 1.1, to facilitate transport in propane and/or other non-gelled alkanes, and/or other similar types of hydrocarbon-based fracturing fluids. Alternately or additionally, the proppant can be provided with a size sufficiently small to promote transport, such as particles having a diameter of 105 micros or less. In various embodiments, the proppant can include hollow materials (e.g., glass bubbles, cenospheres, and/or microspheres). In various embodiments, the proppant can include a composite material, such as a syntactic foam. In various embodiments, the proppant can include a porous material, such as an aerogel, a resin-coated aerogel, a pumice, a resin-coated pumice, a ceramic foam or other foamed material, and/or a tubular-shaped (e.g., cylindrical) material having an axial bore through which fluid can flow. In various embodiments, the proppant can include a crystalline material, such as zircon.

In order to get ideal and complete packing of a fractured formation it is important to have good proppant transport within the formation. The use of liquid alkanes, especially those with low C#s (e.g. alkanes containing between one (1) and six (6) carbons) and therefore high vapor pressures and viscosities may present a problem related to proppant transportation. Such alkane based fracturing fluids can be less capable of transporting conventional proppant materials the same distance as water-based fracturing fluids because of their density, and viscosity. This may be cured through selection of proppants with characteristics that are more conducive to use with alkane based fracturing fluids.

In order to increase the transportability of proppants to make up for the reduced carrying capacity of alkane fracturing fluids one may modify a number of characteristics of the proppant material. One of these characteristics is the specific gravity of the proppant material being used relative to the hydrocarbon-based fracturing fluid in which it is being carried. The less dense will have a lower specific gravity the proppant material the slower the proppant will settle. As the proppant density gets close to the density of the fracturing fluid the proppant may become substantially neutrally buoyant, or even positively buoyant, relative to the fracturing fluid transporting it. While reducing the density of the proppant would be beneficial for transportability of the proppant it is difficult to get a proppant with the strength required to maintain a fractured formation, especially given the low densities of the higher vapor pressure alkanes. Another characteristic of the proppant material that may be tailored to the alkane based fracturing fluid is the proppant grain size. Stokes law which, when extrapolated states that the terminal (or settling) velocity, the excess force Fg due to the difference between the weight and buoyancy of the sphere (both caused by gravity [5]) is given by:

$$F_g = (\rho_p - \rho_f)g\frac{4}{3}\pi R^3,$$

with $\rho_p$ and $\rho_f$ the mass densities of a spherical proppant and fluid, respectively, and g the gravitational acceleration. Requiring the force balance $F_d = F_g$ and solving for the velocity V gives the terminal velocity $V_s$. Note that since buoyant force increases as $R^3$ and Stokes' drag increases as R, the terminal velocity increases as $R^2$ and thus varies greatly with particle size as shown below. If the particle is falling in the viscous fluid under its own weight, then a terminal velocity, or settling velocity, is reached when this frictional force combined with the buoyant force exactly balances the gravitational force. This velocity V (m/s) is given by:[5]

$$V = \frac{2}{9}\frac{(\rho_p - \rho_f)}{\mu}gR^2$$

(vertically downwards if $\rho_p > \rho_f$, upwards if $\rho_p < \rho_f$), where:
g is the gravitational acceleration (m/s²)
$\rho_p$ is the mass density of the particles (kg/m³)
$\rho_f$ is the mass density of the fluid (kg/m³)
μ is the dynamic viscosity (kg/m*s).),
dictates that settling rate of a material in a fluid is proportional to the square of the radius of the particulate size of the proppant material. Therefore, by reducing the diameter of the proppant particles one would be able to increase their transportability by reducing the rate at which the proppant particulates will settle. A problem that may traditionally result from the reduction of proppant grain size is the reduction in the pore size between packed proppant particulates, and an associated reduction in permeability of the propped fracture. This problem, however, is mitigated by the use of high vapor pressure (e.g. Reid vapor pressures between the range of 2 and 200 PSIG) alkanes as a fracturing fluid since they may be transported through pore sizes much smaller than other fracturing fluids (such as water). Therefore, the combination of alkane fracturing fluids with proppants having small grain sizes may be synergistically beneficial.

Another benefit of using proppant having a relatively small grain size is that the strength of each proppant particle does not need to be as great proppants having a larger grain size. As the size of the proppant particulate decreases the forces acting on the formation and proppant as a whole are distributed across many more points of contact than there would be if proppants having a larger grain size were utilized. Therefore, by using small particulate size proppants one would be able to increase transportability of the proppant in the formation, and decrease the strength of the proppant required to avoid crushing. This distributed loading of forces across more proppant particulates would additionally reduce the likelihood of embedding of proppant in the formation material.

While FIG. 1 depicts three proppant storage vessels (34A, 34B, 34C) in association with a conveyor (36) for transporting the proppant to a hopper (38) or other type of second container, it should be understood that in various embodiments, a single hopper or container could be used, while omitting separate storage containers and a conveyor, or use of a hopper or other type of secondary container could be omitted while proppant is conveyed toward the well (10) directly from storage containers. Generally, the hopper (38)

serves as a location where a lubricating fluid from a lubrication source (40) (e.g., a tank) can be provided to dispensed proppant, via a conduit (44) and lubrication pump (42). Usable lubricating fluids can include fracturing fluid identical or similar to that stored in the tanks (18A, 18B, 18C) of the fluid addition subsystem (12), mineral oil, or any other suitable lubricant that is generally non-damaging to system components and compatible with the fracturing fluid in the tanks (18A, 18B, 18C), and the formation and reservoir fluids in the well (10). In an embodiment, usable lubricants can include one or more friction-reducing additives, such as those described above with regard to use of a fluidized solid proppant, for enabling proppant to be flowed from the vessels (34A, 34B, 34C) into the flowstream of the fracturing fluid without requiring formation of a slurry and/or in the absence of a substantial quantity of fluid. In various embodiments, use of a lubricant may be unnecessary, such as when glass bubbles or a similar type of friction-reduced proppant material is used. For example, any of the proppant materials described herein could be mixed with a friction-reducing additive to allow flowing thereof in the substantial absence of liquid.

A proppant pump (45) can be used to drive the proppant and lubricating fluid toward the well (10) and/or to slurry the proppant with the lubricating fluid, if desired and/or necessary. In an embodiment, the proppant pump (45) can include a positive displacement pump and/or a centrifugal pump. In a further embodiment a positive displacement pump can be provided in a non-horizontal orientation to facilitate intake of proppant from a vertically oriented vessel. As depicted in FIG. 1, the proppant can be mixed with the flowstream of fracturing fluid from the fracturing fluid addition subsystem (12) at an addition point (46) within the low pressure region (32) of the conduit, such that the flow of the proppant and fracturing fluid can mix and/or slurry the proppant and fluid (e.g., due to turbulent flow and/or other factors) to achieve a desired proppant concentration. Generation of a slurry of proppant and fracturing fluid having a generally constant proppant concentration enables the amount of proppant added at the addition point (46) to be controlled solely by modifying the rate of addition of the proppant slurry.

It should be understood that the depicted proppant addition subsystem (14) is only one exemplary embodiment by which proppant can be added to a stream of fracturing fluid. In an embodiment, a venturi nozzle (47) can be positioned in communication with the flowstream of fracturing fluid, e.g., at or near the addition point (46) (e.g., upstream thereof), thereby increasing the velocity and reducing the pressure of fluid at the downstream end of the nozzle (47), such that the flow of lower-pressure fracturing fluid across and/or proximate to the addition point (46) can draw proppant through into the flowstream. A diffuser (49) can be provided downstream from the nozzle (47). An elastomeric (e.g., self-adjusting) nozzle can be used to facilitate a constant pressure drop across the nozzle, thereby facilitating control of the rate/concentration of proppant. Use of a venturi nozzle can further facilitate mixing and/or slurrying of the proppant and fracturing fluid.

In lieu of or in addition to the methods of flowing the proppant described above, in various embodiments, inert gas can be mixed with the proppant in the vessels (34A, 34B, 34C), the pressure from which can be used to facilitate driving the proppant toward the well (10). Alternatively or additionally, a separator, such as a piston or bladder, similar to that described above with regard to the tanks (18A, 18B, 18C) can be used to facilitate driving the proppant toward the well (10).

One embodiment of a system for implementing a high vapor pressure hydrocarbon based fracturing fluid frac may utilize two separate and distinct pumping systems, each pumping different materials under different conditions into the formation. A first pump system may be used to pump high vapor pressure alkanes into the formation, while a second pump system may be used to pump low vapor pressure alkanes (less than 2 PSIG Reid Vapor Pressure) and a proppant material into the formation. Since the first pump system would be used to pump materials that would be gases at normal atmospheric conditions it would have to be capable of operating under higher pressures than atmospheric pressure. Alternatively, since the second pump system would be used to pump materials that would be liquid under normal atmospheric conditions they would not have to be maintained at pressure, but could instead be configured similar to more conventional pumping systems. The proppant addition subsystem would be connected to the second pump system for a number of reasons. First, since the second pump system would not have to operate under pressure, the proppant addition subsystem would similarly not have to operate under pressure and would therefore be less complicated and expensive. Additionally, since the second pump system would be pumping a fracturing fluid that is relatively viscous, when compared to the fracturing fluid being pumped by the first pump system, it would be able to more easily transport proppant materials. Accordingly, an operator would only need to have a proppant addition subsystem to one of the two pumping systems, likely the second pumping system because the more viscous fracturing fluid could transport more proppant and because the proppant addition subsystem would not have to be pressurized and therefore would cost less, be less complicated, and be safer. An additional benefit of using the second pumping system to introduce the proppant to the formation would be that the more viscous fracturing fluid being pumped through the second pumping system would better lubricate the interior of the system and therefore would reduce the amount of erosive wear on pumping system components due to the pumping of abrasive proppant materials. This would reduce the wear on the pumping system components and extend their operational lifespan, thereby further reducing operating costs.

Use of a low vapor pressure alkane (eg. mineral oils) in the second pump system would also require less pressure bleed-off from the system, and therefore would decrease the amount of downtime that the system would require for maintenance and loading additional proppant for subsequent fracture stages.

In such a fracturing system the flows of the two pumping systems may be combined at any point downstream of the pumping portions of the respective pumping systems. This may include at a point before the wellhead, at the wellhead itself, or downstream of the wellhead.

Ratios of the materials being pumped by the split stream system may be varied according to needs. Both the rate and amount of proppant per volume of fracturing fluid in the second pumping system may be varied and the amount of fracturing fluid from the first pumping system relative to the amount of fracturing fluid from the second pumping system. Therefore, the operators may modulate the amount of each material being introduced to the formation in order to achieve different results.

As fracturing fluid and/or proppant in the low pressure region (32) flows toward the well (10) it is pressurized by one or more high pressure fracturing pumps (70A, 70B, 70C, 70D), defining a high pressure region (72) of the conduit, such that the fluid provided into the well (10) is at a pressure sufficient to generate fractures in the formation. The depicted power subsystem (16) is usable to provide power to the high pressure pumps (70A, 70B, 70C, 70D), and/or to other system components (such as the pumps (26A, 26B, 26C, 30, 42, 45) usable to flow fracturing fluid, proppant, and/or lubricating fluid, the proppant conveyor (36), one or more valves associated with system components, and/or other similar elements).

While any number and type of high pressure pumps can be used, FIG. 1 depicts four high pressure pumps (70A, 70B, 70C, 70D) usable to pressurize the fracturing fluid. The first and second high pressure pumps (70A, 70B) are shown positioned on a first transport vehicle (48A), which can include, by way of example, a flatbed trailer, a truck, a skid, or any other transportable platform or framework. Similarly, the third and fourth high pressure pumps (70C, 70D) are shown positioned on a second transport vehicle (48B).

While FIG. 1 depicts two transportable vehicles (48A, 48B), each having two variable frequency drives, two electrical motors, and two high pressure pumps thereon, it should be understood that any number of transportable vehicles can be used, and further, each transportable vehicle could include a single high pressure pump or three or more high pressure pumps without departing from the scope of the present disclosure. Additionally, while FIG. 1 depicts a single transformer used in conjunction with two variable frequency drives, two motors, and two high pressure pumps, any number of transformers could be used, or in an embodiment, a suitable voltage could be provided to the components of the power subsystem (16) directly, obviating the need for transformers on the transportable vehicles. Further, while FIG. 1 depicts a single variable frequency drive used to actuate a single electrical motor, which in turn powers a single high pressure pump, in various embodiments, a variable frequency drive could actuate multiple motors, multiple variable frequency drives could be used to actuate a single motor, a single motor could power multiple high pressure pumps, and/or multiple motors could power a single high pressure pump.

Figure 6A:
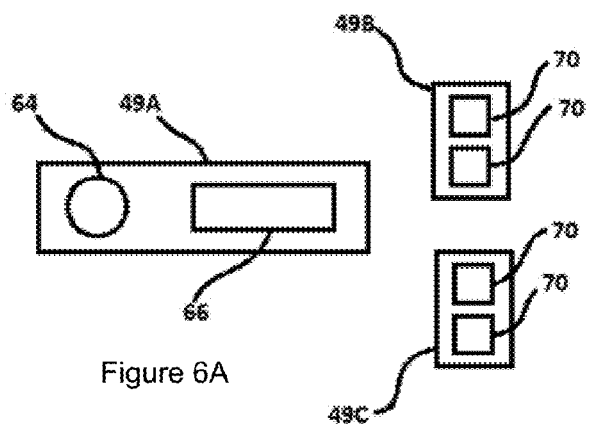
FIG. 6A depicts a diagram of an embodiment of a power and pumping subsystem usable within the scope of the present disclosure.
Figure 6B:
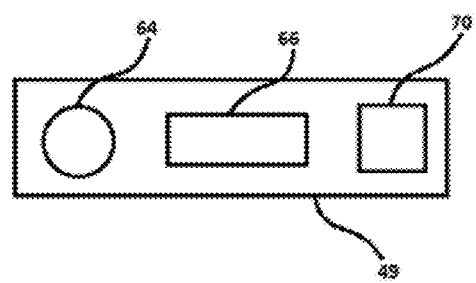
FIG. 6B depicts a diagram of an embodiment of a power and pumping subsystem usable within the scope of the present disclosure.
Figure 6C:
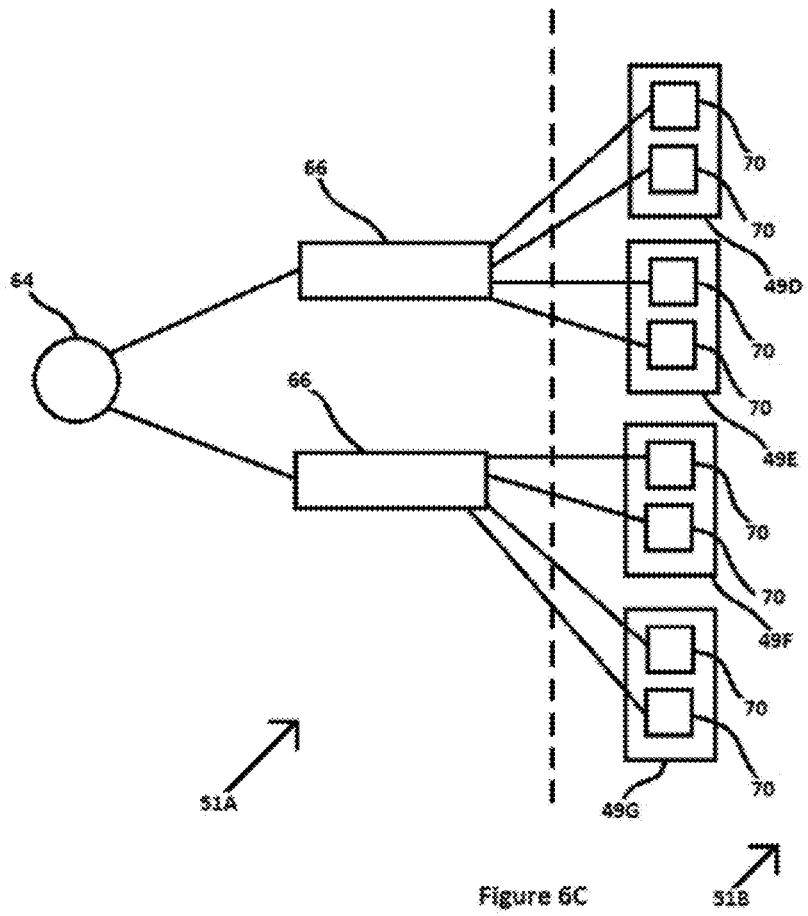
FIG. 6C depicts a diagram of an embodiment of a power and pumping subsystem usable within the scope of the present disclosure.

For example, FIGS. 6A through 6C depict exemplary embodiments of pumping and power subsystems usable within the scope of the present disclosure. FIG. 6A depicts a transformer (64) and a variable frequency drive (66) positioned on a first mobile vehicle (49A), two pumps (70) with associated motors (not shown) positioned on a second mobile vehicle (49B), and two pumps (70) with associated motors (not shown) positioned on a third mobile vehicle (49C). The depicted configuration can utilize a plurality of vehicles (49A, 49B, 49C) to reduce the amount of weight carried by a single vehicle, and is usable for low (e.g. 600 volts) and/or medium voltage applications (e.g. 4160 volts). FIG. 6B depicts a configuration in which a transformer (64), variable frequency drive (66), and a pump (70) with an associated motor (not shown) are positioned on a single mobile vehicle (49), which can also be used in low and/or medium voltage applications.

FIG. 6C depicts an embodiment in which an operational site has been conceptually divided into a "hazard zone" (51B), where potentially dangerous operations can be performed and/or volatile components may accumulate, and a "remote zone" (51A) that is separated and/or spaced from the hazard zone (51B). A transformer (64) and two variable frequency drives (66) are shown positioned in the remote zone (51A), while a plurality of mobile vehicles (49D, 49E, 49F, 49G), each having two pumps (70) with associated motors (not shown) are depicted in communication with the variable frequency drives (66) and positioned in the hazard zone (51B). In addition to maintaining a separation between the transformer (64) and variable frequency drives (66) and the hazard zone (51B), the depicted embodiment can be used in high voltage applications (e.g., 4170 volts).

Returning to FIG. 1, positioning components of the power subsystem (16) in close proximity to one another, e.g., on transportable vehicles (48A, 48B) can enable other synergistic benefits to be obtained. For example, in an embodiment, air from one or more blowers used to cool the electric motors (68A, 68B, 68C, 68D) and/or maintain positive pressure therein could be channeled to the adjacent high pressure pumps (70A, 70B, 70C, 70D), e.g., by positioning each motor and associated high pressure pump in a single housing and/or connecting the housing of each motor to that of each associated pump via an air conduit. Air from the blowers could thereby dissipate/disperse any propane or other alkanes and/or other flammable materials proximate to the pumps during operation, thereby preventing accumulation of flammable materials in a concentration that could be ignited. In one embodiment, the coupling and/or shaft connecting the motors to respective high pressure pumps could be provided with fins, blades, and/or other similar protrusions, such that rotation of the shaft can circulate air proximate to the high pressure pumps, and/or blower air from the motors can facilitate rotation of the shaft via the fins/protrusions by adding rotational motive force thereto.

For example, FIG. 2A depicts an embodiment of an electric-powered motor (72) having a blower (74) associated therewith, typically usable to provide air to the operative and/or moving parts of the motor (72), e.g., to cool the motor (72), represented by the air flowpath (76). A drive shaft (80) of the motor (72) is shown extending therefrom to engage an adjacent pump (78) (e.g., a high pressure pump usable in fracturing operations). Rotation and/or other types of movement of the drive shaft (80) as the motor (72) is powered can thereby actuate the pump (78). An air conduit (82) is shown extending between the motor (72) and the pump (78), such that air from the blower (76) can flow through the conduit (82) to the pump (72), as indicated by the flowpath (84), e.g., for dissipating gas proximate thereto.

FIG. 2B depicts an alternate embodiment in which the motor (72), blower (74), pump (78), and drive shaft (80) are shown. In the depicted embodiment, an air conduit (86) is circumferentially disposed around the drive shaft (80), such that air from the blower (74) that moves across the motor (72), as indicated by the flowpath (86), can pass through the conduit (86), as indicated by the flowpath (88), e.g., to dissipate gas proximate to the pump (78).

FIG. 2C depicts an alternate embodiment in which the motor (72), blower (74), pump (78), and drive shaft (80) are shown, contained within a single housing (96). Air from the blower (74) that passes across the motor (72), as indicated by the flowpath (76), can thereby also flow proximate to the pump (78), as indicated by flowpaths (86A, 98B).

It should be understood that while FIGS. 2A through 2C depict three possible methods by which air from a blower associated with a motor can be circulated in proximity to a pump, any method for conveying air to the pump can be used without departing from the scope of the present disclosure, and any of the features depicted in FIGS. 2A through 2C are usable singularly or in combination.

FIG. 3 depicts an embodiment in which the motor (72), blower (74), pump (78), and drive shaft (80) are shown, in which the drive shaft (80) includes multiple protrusions (90A, 90B) (e.g., fins, blades, etc.) extending therefrom. Air from the blower (74) can be provided, e.g., to cool the motor (72), as indicated by flowpath (76). The air can then flow, as indicated by flowpath (100), to contact one or more protrusions (90A, 90B), thereby imparting motive force thereto, and subsequently, to the drive shaft (80), such that the flow of air can cause additional rotation of the drive shaft (80), as indicated by the arrows (102A, 102B). While only two protrusions (90A, 90B) are shown in FIG. 3, any number and placement/configuration of protrusions can be used without departing from the scope of the present disclosure. Further, it should be understood that protrusions extending from the drive shaft can be used singularly or in combination with any of the features shown in FIGS. 2A through 2C.

FIG. 4 depicts an embodiment in which the protrusions (90A, 90B) are themselves usable as an air-moving device. The motor (72), blower (74), pump (78), and drive shaft (80) are shown, in which the drive shaft (80) includes multiple protrusions (90A, 90B) extending therefrom. Movement of the drive shaft (80), e.g., imparted by the motor (72), as indicated by arrow (92), can thereby cause rotation of the protrusions (90A, 90B), which can be configured and/or oriented to circulate air proximate to the pump (78), as indicated by the flowpaths (94A, 94B).

FIG. 5 depicts a diagrammatic side view of an embodiment of a variable frequency drive (104) usable within the scope of the present disclosure. It should be understood that while a variable frequency drive is depicted and described herein, the concept illustrated in FIG. 5 is usable with any element of the system depicted in FIG. 1. Specifically, during operations, it is possible for air at or proximate to the variable frequency drive (104) and/or other system components to become contaminated (e.g., with volatile gasses when using propane or similar components as a fracturing fluid, or with other fluids/gasses depending on the operations being performed). A region of contaminated air (108) is shown proximate to the top of the variable frequency drive (104), while generally clean air (111) (e.g., lacking contaminants heavier than air) is shown above the contaminated air (108). During use, it may be necessary for the variable frequency drive (104) to intake air (e.g., for cooling and/or for operation thereof), while the intake of propane, volatile components, and/or other contaminants would be undesirable. FIG. 5 depicts an air conduit (106) (e.g., a "snorkel") extending from and/or otherwise engaged with the variable frequency drive (104) for communicating clean air (111) into the variable frequency drive (104), while isolating the variable frequency drive (104) from contaminated air.

Figure 7:
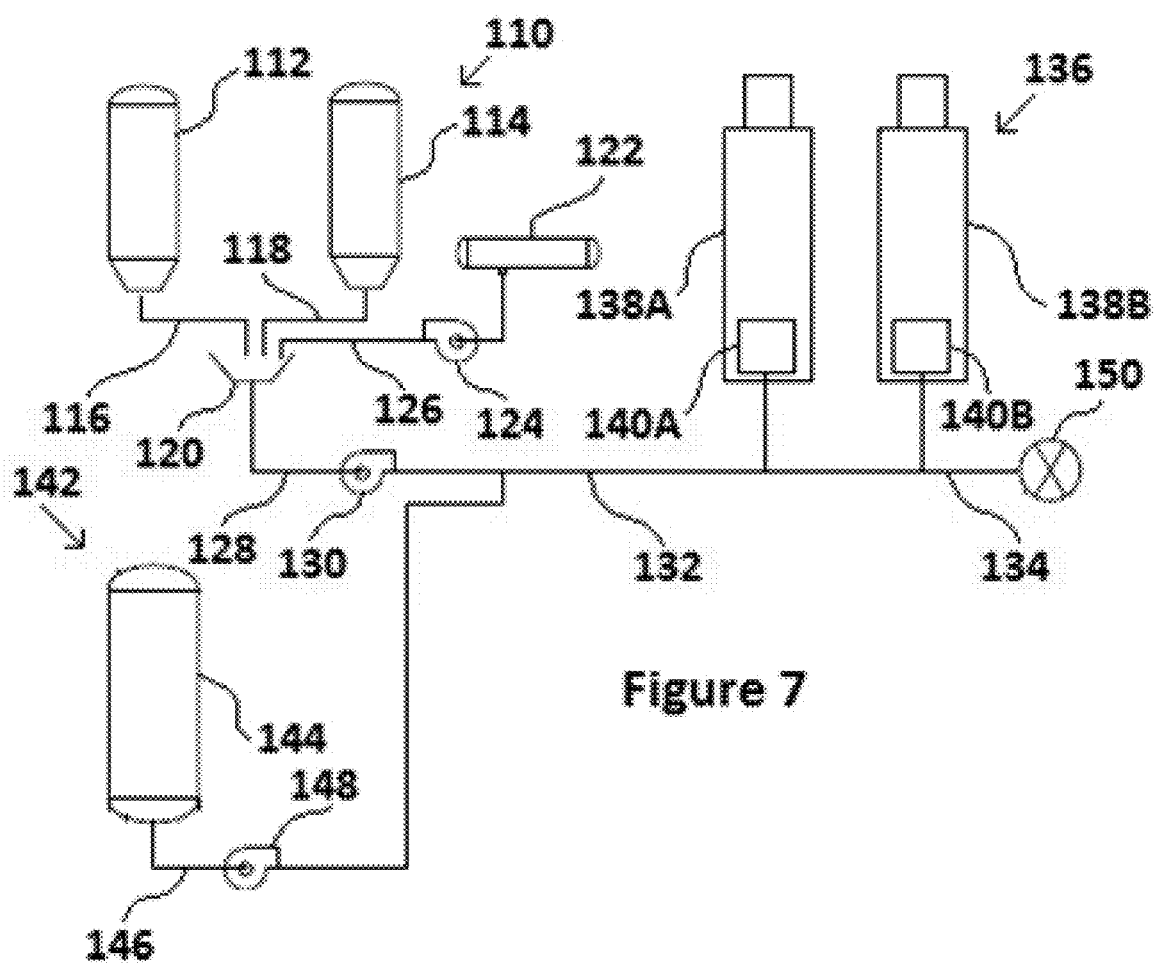
FIG. 7 depicts an embodiment of a system usable within the scope of the present disclosure.

FIG. 7 depicts an embodiment of a system usable within the scope of the present disclosure. Specifically, FIG. 7 depicts a system usable to inject a fluid under pressure into a well (150), e.g., to stimulate production of hydrocarbons or other products by forming fractures in the wellbore formation. While conventional fracturing operations provide a pressurized fracturing fluid into a well, mixed with proppant (e.g., solid particulate matter) to maintain and/or support the fractures while permitting the flow of hydrocarbons or other fluids from the formation into the wellbore and toward the surface, the depicted embodiment is usable to flow a fluidized solid proppant, substantially free of liquid.

Conceptually, FIG. 7 divides the depicted system into a proppant addition subsystem (110) for providing proppant into the well (150), a pumping subsystem (136) for pressurizing proppant and/or other flowstreams for injection into the well (150), and a fluid subsystem (142), which can be used to provide fluid into the well (150), e.g., to form fractures in the formation prior to the flowing of proppant thereto and/or to displace unused proppant from the well (150). It should be understood that the number, type, and arrangement of components shown in FIG. 7 is only one exemplary embodiment, and that the depicted illustration is diagrammatic, intended to conceptually depict one embodiment of the present system. As such, it should be noted that any number, type, and arrangement of identical or similar components could be used without departing from the scope of the present disclosure.

The depicted proppant addition subsystem (110) is shown including a proppant storage vessel (112), and an additive storage vessel (114), both of which can include, for example, a silo, tank, hopper, or any other type of container or vessel usable to contain particulate solid matter. Use of vertically oriented proppant storage vessels, such as silos, can enable gravity and/or the weight of the contents within the vessels (112, 114) to drive the contents from the containers, while also reducing the footprint presented by the containers. One exemplary storage container could include a Model 424 Sand Silo, produced by Loadcraft Industries, LTD of Brady, Tex., which can include an associated transportation trailer.

The proppant storage vessel (112) can contain solid particulate matter (e.g., sand, ceramic, glass, clay, gravel, and/or other suitable materials usable as proppant), which can be flowed, pumped, and/or otherwise transferred, e.g., via a conduit (116) to a hopper (120) or other type of container. The conduit (116) can include a conveyor, chute, trough, pipe, or any other suitable means usable to transport solid particulate matter, accompanied by any manner of associated valves, doors, pumps, or other types of control mechanisms usable to regulate the passage of proppant from the proppant storage vessel (112). In an embodiment, the proppant storage vessel (112) could be positioned in direct association with the hopper (120), such that a conduit is not necessary. For example, the proppant storage vessel (112) could be positioned above the hopper (120), such that proppant could fall directly into the hopper (120).

The additive storage vessel (114) can contain a solid, friction-reducing additive, such as molybdenum disulfide, carbon black, graphite, fumed silica, epoxy matrix resin nanoparticles, glass bubbles, and/or any other solid additive or liquid additive (e.g., silicone) capable of forming a friction-reducing coating about one or more particles of proppant and/or occupying spaces between particles of proppant to reduce friction and facilitate the flow thereof. The contents of the additive storage vessel (114) can be transferred to the hopper (120) via a conduit (118), which can include any manner of conveyor, chute, trough, pipe, or other suitable means, accompanied by associated valves, doors, pumps, or other types of control mechanisms usable to regulate the passage of the additive from the additive storage vessel (114). In an embodiment, the additive storage vessel (114) could be positioned in direct association with the hopper (120), such that the conduit (118) is not necessary.

While FIG. 7 depicts a hopper (120), adapted to receive contents from the proppant and additive storage vessels (112, 114), in various embodiments, the hopper (120) could include an auger, a blender, or other types of mixing devices usable to facilitate the combination of the proppant and additive materials (e.g., to coat and/or thoroughly mix the contents of the hopper (120)). A lubricant source (122), depicted as a tank, can be used to dispense a fluid (e.g., mineral oil, water, fracturing fluid, or any other suitable lubricant that is compatible with the proppant and additive materials) into the hopper (120) via a conduit (126) and associated pump (124). As described above, the lubricant can be used, generally, to facilitate mixing of the proppant and additive materials, and/or to facilitate the flow thereof; however, during typical use, the quantity of lubricant dispensed into the hopper (120) can be insufficient to form a slurry with the proppant materials.

It should be understood that while FIG. 7 illustrates a separate proppant storage vessel (112) and additive storage vessel (114), that dispense contents to a hopper (120) via separate conduits (116, 118), for mixing thereof, the depicted configuration is exemplary of a single illustrative embodiment. In other embodiments, the vessels (112, 114) could dispense respective contents into a single, merged conduit, where the proppant and additive mix, such that use of a separate hopper within which the proppant and additive can be combined is unnecessary. In still other embodiments, the proppant, any additive materials, and a lubricant, if used, can be prepared off-site, and a single container of fluidized solid proppant can be present, in lieu of the depicted storage vessels (112, 114), hopper (120), and lubricant source (122). In other embodiments, the proppant and additive can be prepared off-site, and dispensed from a single container, facilitated by the lubricant source (122). Similarly, the proppant and lubricant, or additive and lubricant could be mixed off-site, then combined with the remaining components at an operational site.

In other embodiments, a fluidized solid proppant could be used in the absence of a friction-reducing additive. For example, glass bubbles and/or microspheres, such as those made by 3M of St. Paul, Minn., could be used as a fluidized solid proppant, in the absence of an additional friction-reducing additive. In such an embodiment, a single proppant storage vessel could be used in lieu of the two depicted storage vessels (112, 114), in the presence or absence of a lubricant, as needed.

In still other embodiments, various types of pumps and/or other devices can be used to vibrate and/or pulse system conduits and/or vessels, as needed, to vibrate the fluidized solid proppant to reduce friction between particles thereof, allowing the proppant to flow in the manner of a liquid. For example, in an embodiment, a pneumatic conveying system could be used to project a fluid to pulse and/or vibrate sand or similar particulate matter to facilitate flow thereof.

Independent of the type of fluidized solid proppant used and/or the location and manner of preparation and/or storage thereof, the proppant storage vessel (112) is shown in fluid communication with the well (150). In the depicted embodiment, the hopper (120) is configured to dispense fluidized solid proppant via a conduit (128) (e.g., a pipe or similar member able to transport fluids to the well (150)), assisted by a booster pump (130) (e.g., a positive displacement pump or similar type of pump), to a low pressure region (132) of the conduit. As described above, the term "fluidized solid proppant" is used to describe, in general terms, solid matter (e.g., particulate matter) that flows in the manner of a liquid when transported under certain conditions (e.g., a threshold pressure and/or velocity) while functioning in the manner of a solid when stationary and/or under a pressure less than the threshold pressure. As such, the booster pump (130) and/or other associated equipment, conduits, etc., can be configured to dispense the fluidized solid proppant toward the well (150) under pressure/velocity conditions that enable the proppant to flow in the manner of a liquid, while remaining substantially free of liquid components. As described above, the fluidized solid proppant, while not wholly void of liquid, could be termed "substantially free" of liquid when the quantity of liquid mixed therewith is insufficient to form a slurry with the proppant.

The pumping subsystem (136) is shown in communication with the low pressure region (132). Specifically, two transportable pumping units (138A, 138B) are shown, each having a high pressure fracturing pump (140A, 140B) positioned thereon. While FIG. 7 depicts two pumping units (138A, 138B), each having a single pump thereon, it should be understood that the depicted embodiment is an illustrative diagram, and any number and configuration of pumping units, having any number of pumps and/or other equipment associated therewith (e.g., power sources, motors, drivers, etc.) can be used without departing from the scope of the present disclosure. Examples of usable pumping systems are described previously. Further examples of usable pumping systems are described in published United States Patent Application 2012/0255734, incorporated by reference above. Other usable pumping systems are described in the U.S. Provisional Application for patent, having the Application Ser. No. 61/889,187 filed Oct. 10, 2013, incorporated by reference above.

As the fluidized solid proppant in the low pressure region (132) flows toward the well, it is pressurized by the high pressure fracturing pumps (140A, 140B), defining a high pressure region (134) of the conduit. In an embodiment, the proppant can be provided into the well (150) at a pressure sufficient to generate fractures in the formation. The pressure provided by the pumps (140A, 140B) can then be reduced, thereby slowing the velocity of the proppant, such that at least a portion of the proppant engages the formation and remains within the fractures, thereby maintaining and/or supporting the fractures.

Depending on the nature of the fluidized solid proppant used, in various embodiments, it may be desirable to use pressurized fracturing fluid (e.g., water, hydrocarbons, etc.) to form fractures in the formation, then displace the fracturing fluid by the provision of fluidized solid proppant into the well (150). As such, FIG. 7 depicts a fluid supply subsystem (142) that includes a tank (144) usable to contain one or more fluid media usable as a fracturing fluid (e.g., to form fractures in the wellbore formation when pressurized). For example, the depicted tank (144) could contain water, liquid petroleum gas (e.g., as described in U.S. Pat. No. 8,408,289, incorporated by reference above), propane and/or other alkanes or hydrocarbons, described above and in the U.S. Provisional Application for patent, having the Application Ser. No. 61/889,187 filed Oct. 10, 2013, incorporated by reference above, halogenated hydrocarbons, as described above and in Applications 61/889,187 and 61/807,699, incorporated by reference above, or any other fracturing fluid known in the art or disclosed in any of the related application incorporated by reference in this disclosure.

While FIG. 7 depicts a single tank (144), it should be understood that any number and configuration of vessels and/or pipelines can be used to supply fluid to the well (150) without departing from the scope of the present disclosure. Use of vertically-oriented tanks to contain fracturing fluids (including volatile fluids) can enable gravity and/or vapor pressure above the contents of the tanks to aid in driving the contents toward the well (150), thus requiring lower energy and/or lower power pumping equipment, while also enabling the tanks to include a smaller quantity of unused volume (e.g., "tank bottoms") when compared to a horizontally-oriented tank. Vertical tanks also provide a smaller footprint than horizontal tanks and other alternatives. The depicted tank (144) is configured to dispense fluid, via a conduit (146), assisted by a booster pump (148) toward the low pressure region (132). The high pressure fracturing pumps (140A, 140B) are usable to pressurize the fluid to a pressure sufficient to form fractures in the formation.

In embodiments where fluid from the fluid supply subsystem (142) is used to form fractures in the formation, fluidized solid proppant can be flowed into the well (150), as described above, subsequent to the use of fracturing fluid, thereby displacing the fracturing fluid from the well (150) and engaging proppant with fractures in the formation.

In an embodiment, additional fluid (e.g., fracturing fluid or a displacement fluid from a separate source (not shown)) can be pumped into the well (150) to displace fluidized solid proppant not engaged with the formation.

FIGS. 8A through 8D depict a diagrammatic view of a wellbore (152), illustrating an embodiment of a method usable within the scope of the present disclosure.

Figure 8A:
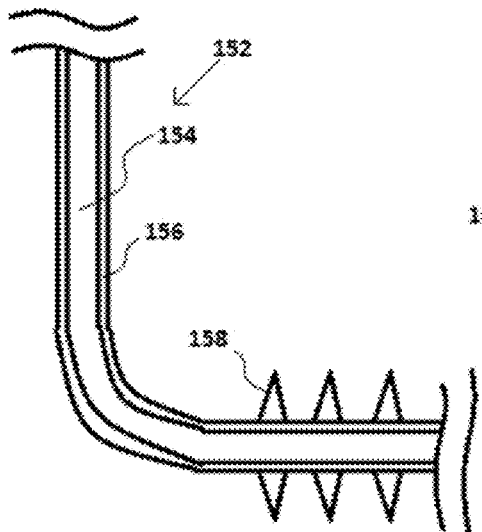
FIGS. 8A through 8D depict diagrams of a wellbore, illustrating an embodiment of a proppant medium usable within the scope of the present disclosure.

Specifically, FIG. 8A depicts the wellbore having an internal bore (154), an annular region (156) disposed circumferentially about the inner bore (154), and a plurality of perforations of which a single perforation (158) is labeled for reference. The internal bore (154), annular region (156), and/or perforations (158) can be filled various wellbore fluids and/or other materials known in the art.

Figure 8B:
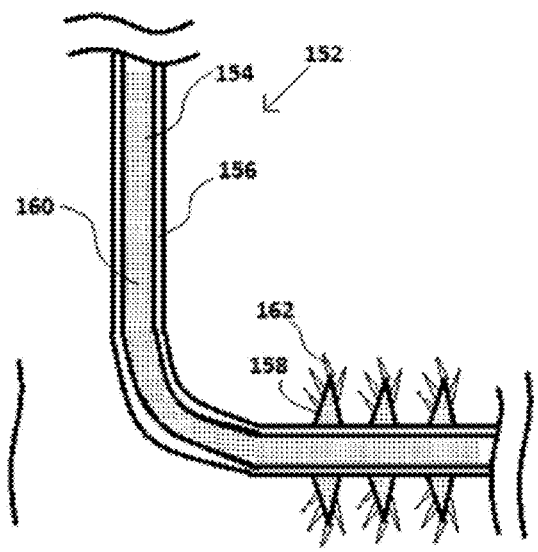

With reference to FIG. 8B, when it becomes desirable to perform a fracturing operation on the wellbore (152), e.g., to stimulate production therefrom, a fracturing fluid (160) (e.g., water, hydrocarbons, etc.) can be flowed, at high pressure, to the perforations (158). While FIG. 8B depicts a fracturing fluid (160) primarily occupying the inner bore (154), it should be understood that during a typical fracturing operation, the generally continuous flow of pressurized fluid can continue such that fracturing fluid occupies the inner bore (154), perforations (158), and annular region (156). The force and/or pressure applied by the fluid (160) to the formation can cause the formation of fractures, of which a single fracture (162) is labeled for reference, at or proximate to the perforations (158).

Figure 8C:
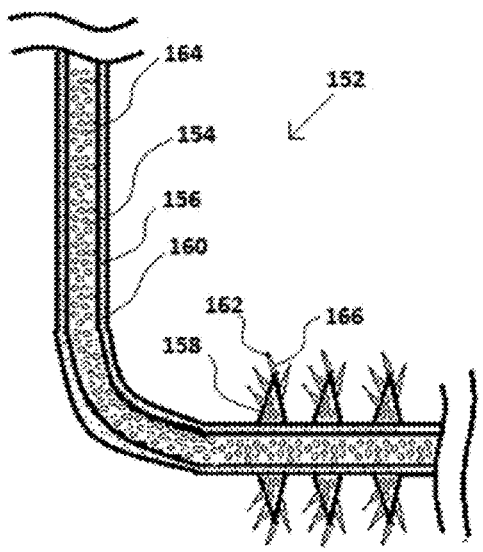

With reference to FIG. 8C, as described previously, a fluidized solid proppant (164) can be flowed to the fractures (162), displacing the fracturing fluid (160), e.g., into the annular region (156), toward the surface, and out of the well (50). While FIG. 8C depicts fluidized solid proppant (164) primarily occupying the inner bore (154), an operation can include the generally continuous flow of fluidized solid proppant, such that the proppant occupies the inner bore (154), annular region (156), perforations (158), and fractures (162). During such an operation, at least a portion of the proppant (166) can enter the fractures (162), such that the release of pressure (e.g., applied from the surface) can cause the fluidized solid proppant (164) to slow and/or settle, such that the portion of the proppant (166) engages the fractures (162) to maintain and/or stabilize the fractures (162) in an open position conducive to production.

Figure 8D:
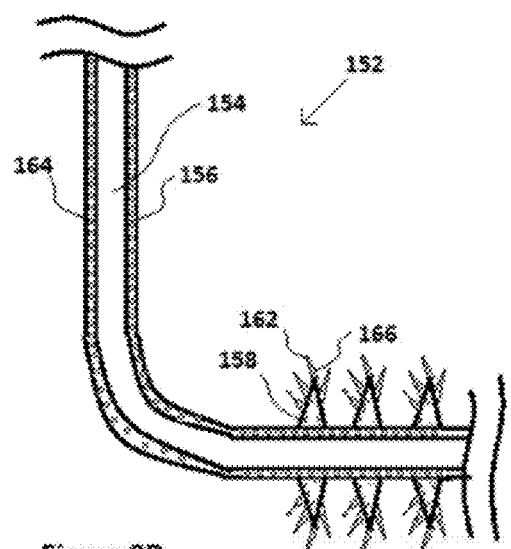

With reference to FIG. 8D, after the engagement of the depicted proppant (166) within one or more of the fractures (162), it may be desirable to flow a displacement fluid into the well (150) (e.g., through the inner bore 1(54)) to displace the proppant (164), e.g., through the annular region (156) and to the surface. Alternatively or additionally, the production of fluid from the formation and/or the continued application of pressure from the surface could remove unused proppant from the well (150).

Figures 9A, 9B:
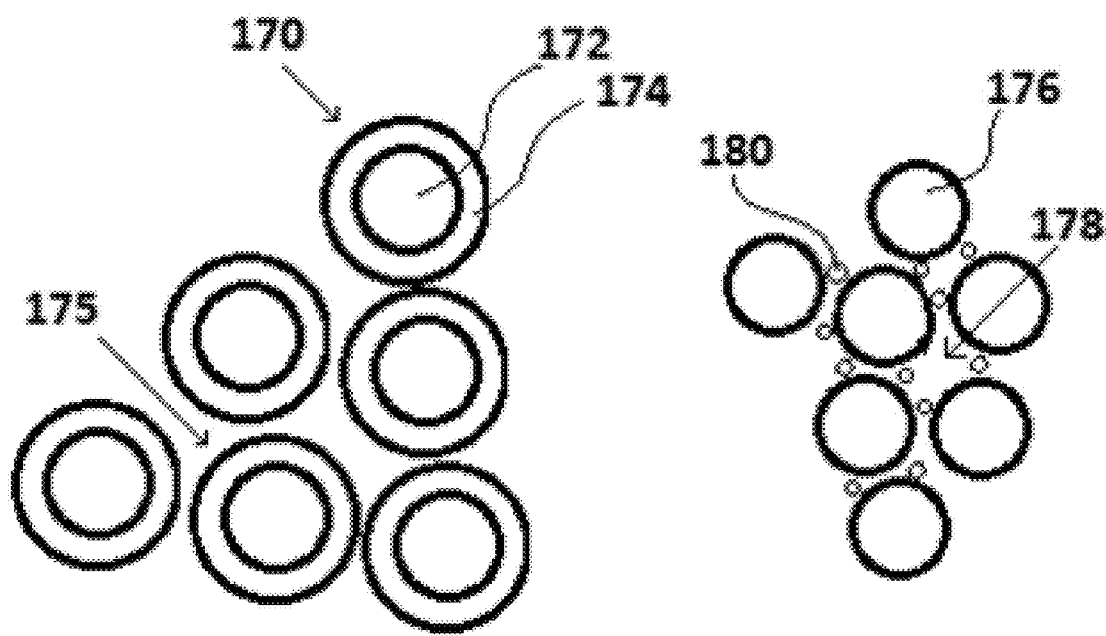
FIG. 9A depicts a diagrammatic embodiment of a proppant medium usable within the scope of the present disclosure.
FIG. 9B depicts a diagrammatic embodiment of a proppant medium usable within the scope of the present disclosure.

FIG. 9A depicts an embodiment of a composition usable within the scope of the present disclosure. Specifically, FIG. 9A depicts an embodiment of a fluidized solid proppant material, of which an exemplary particle of proppant (170) has been labeled for reference. The depicted proppant (170) includes a core (172) of solid particulate material that can include, for example, sand, ceramic, clay, gravel, glass, or any other material having sufficient structural strength to maintain and/or support a fracture within a wellbore formation. A coating (174) of a solid, friction-reducing material is shown disposed about the core (172). Usable coatings can include, for example, molybdenum disulfide, carbon black, graphite, fumed silica, and/or epoxy matrix resin nanoparticles, which can be mixed with solid particulate matter (e.g., the core (12)) until the core is substantially coated, as depicted. A liquid coating, such as silicone can also be used. In an embodiment, a lubricant or similar liquid can be provided, e.g., to wet the materials and/or promote mixing thereof; however, it should be noted that the quantity of liquid can generally be insufficient to form a slurry with the proppant (170). FIG. 9A depicts spaces (175) and/or interstices between the adjacent particles of proppant (170), which can be occupied by a lubricant or other fluid, as desired. The friction-reducing coating (174) on each particle of proppant (170) enables the proppant (170) to flow in the manner of a liquid when moved under certain threshold conditions (e.g., pressure, velocity, etc.), due to the reduction of friction between adjacent particles, while functioning in the manner of a solid when stationary and/or under a pressure less than the threshold pressure.

FIG. 9B depicts an embodiment of a composition usable within the scope of the present disclosure. Specifically, FIG. 9B depicts an embodiment of a fluidized solid proppant material that includes particles of proppant (176), which can include, for example, sand, ceramic, clay, gravel, glass, or any other material having sufficient structural strength to maintain and/or support a fracture within a wellbore formation. The proppant (176) can be mixed with particles of a solid, friction-reducing material (180), such as molybdenum disulfide, carbon black, graphite, fumed silica, glass bubbles, and/or epoxy matrix resin nanoparticles, which can occupy the interstices (178) between particles of proppant (176). A lubricant or similar liquid can be provided, e.g., to wet the materials and/or promote mixing thereof (e.g., the liquid could occupy the interstices (178)); however, it should be noted that the quantity of liquid can generally be insufficient to form a slurry with the proppant (176). The presence of the friction-reducing additive (180) between particles of proppant (176) can enable the proppant (176) to flow in the manner of a liquid when moved at a sufficient velocity, due to the reduction of friction between adjacent particles, while functioning in the manner of a solid when stationary and/or moving at a slower velocity.

While FIGS. 9A and 9B depict mixtures of proppant particles with solid-friction reducing additives, it should be understood that in various embodiments, materials that can flow in the manner of a liquid in the absence of any friction-reducing additives and/or coatings can be used. For example, glass bubbles and/or microspheres can be provided with an external surface having reduced frictional interactions with adjacent particles. In other embodiments, vibration and/or pulsing of proppant materials can be used to reduce friction between particles thereof to enable the proppant materials to flow, e.g., in the substantial absence of liquid.

Figure 10A:
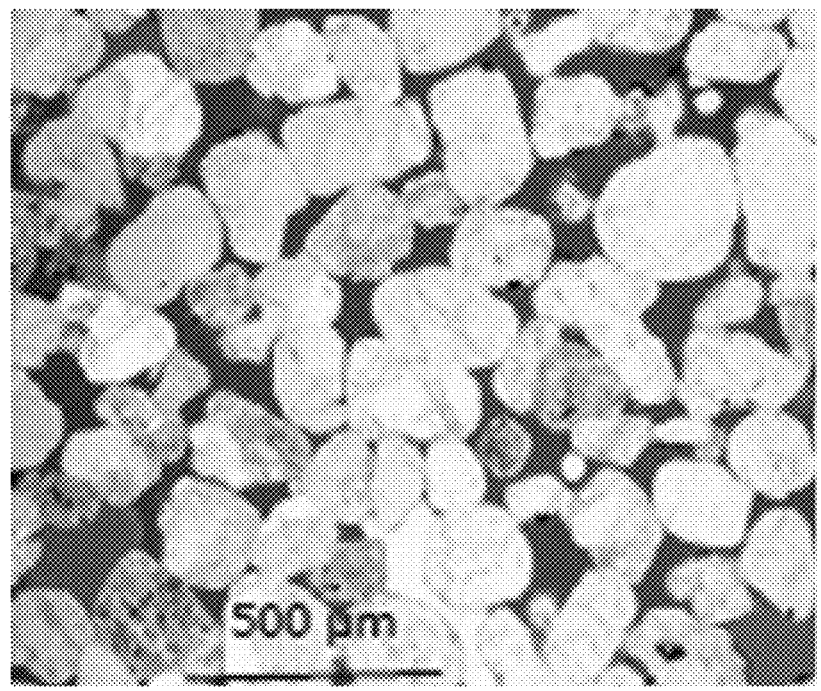
FIG. 10A depicts the grain size and resultant pore size of an exemplary high permeability formation.
Figure 10B:
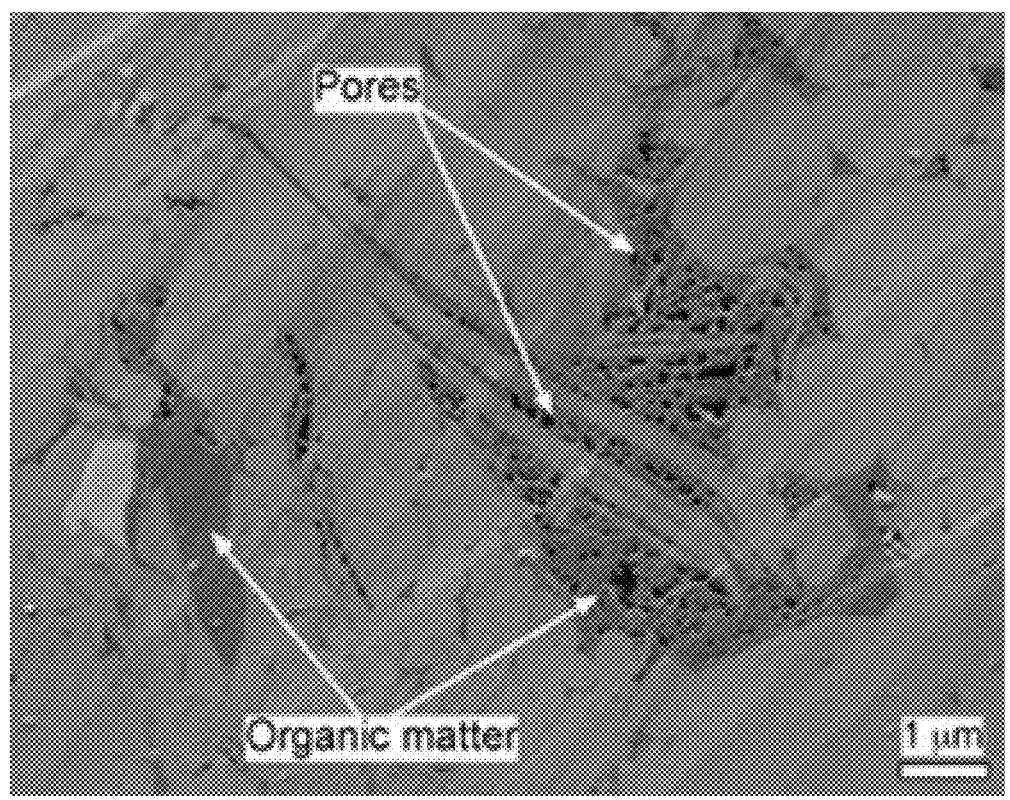
FIG. 10B depicts the grain size and resultant pore size of an exemplary low permeability formation, specifically Barnett Shale.

FIGS. 10A and 10B exemplify the differences between the physical structures of high permeability verses low permeability formations. FIG. 10A depicts a sandstone-like formation such as those that consist of high permeabilities >100 md. The particle size of the formation's constituent materials is on the order of ~200 μm. Like with proppants, large formation particle size usually creates relatively large pores through which fluids may travel. This large size of pores allows for high permeability, which in turn allows for relatively easy flow of fluids therethrough. A formation form having a structure similar to that of FIG. 10A would representative of a conventional reservoir which requires no or minimal stimulation volumes to produce at economic rates. FIG. 10B, on the other hand, depicts a shale-like formation such as Barnett Shale. In such shale formations the particulate size of the material forming the formation is much smaller, and therefore the permeability of the formation much lower, than it is in sandstone-like formations seen in FIG. 10A. In fact, in such shale formations the pores size can be ~0.2 to 0.05 µm, which is around 1,000 to 4,000 smaller than that of the high permeability formation. Given the much smaller pore size in the shale formation of FIG. 10B than that of the sandstone formation of FIG. 10A it is much easier to flow most materials through the formation. As discussed hereinabove, among several beneficial properties, is the property that high vapor pressure hydrocarbon fluids can be transported through materials having low permeability much more easily than aqueous fluids. The use of such highly transportable hydrocarbon based fracturing fluids in such low permeability formations may provide for several beneficial effects.

Figure 11:
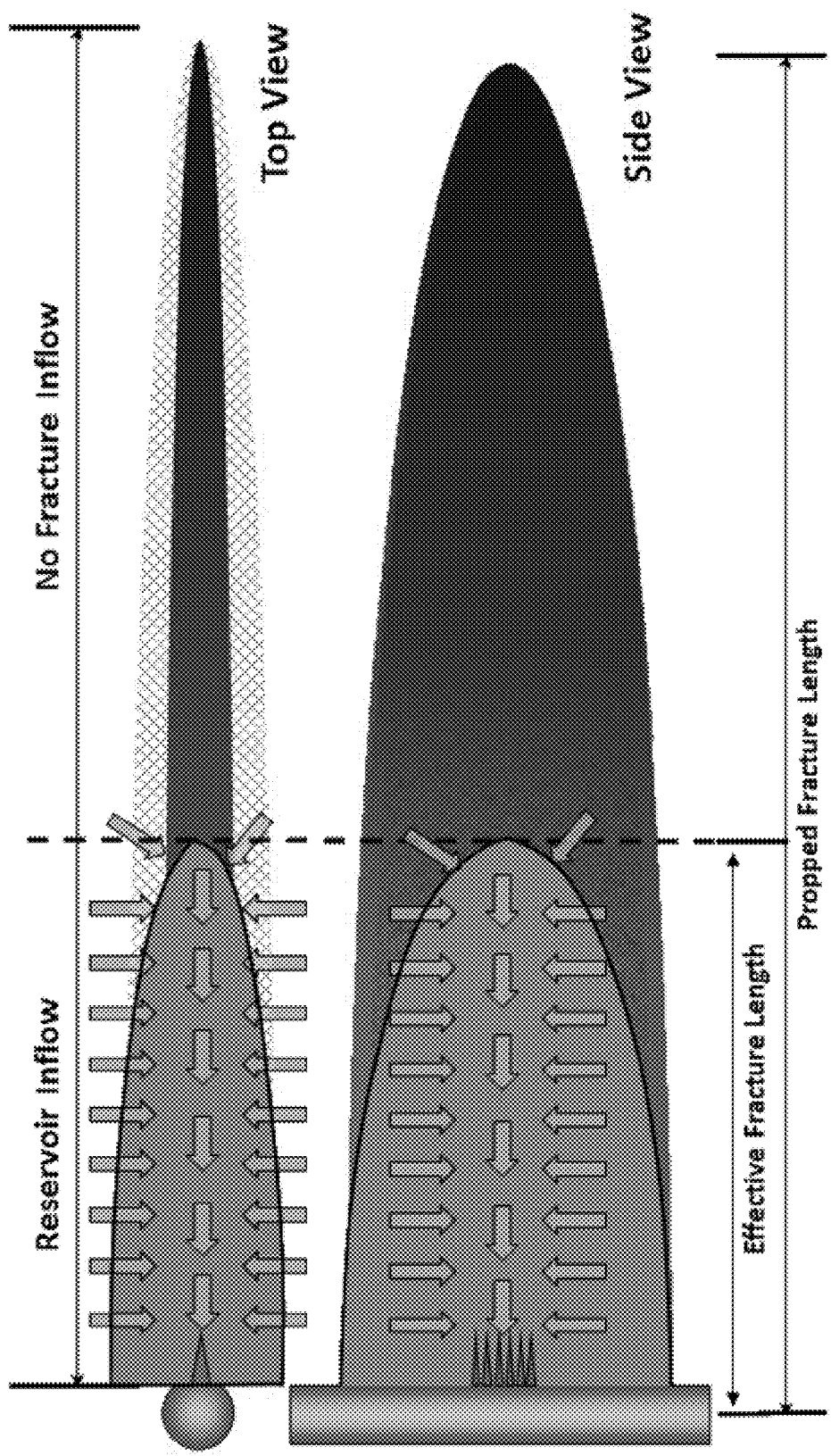
FIG. 11 depicts the effects of a fracture system caused through the use of an aqueous based fracturing fluid.

FIG. 11 depicts a diagrammatic look at a fracture created through the use of an aqueous fracturing fluid. As can be seen, the effective fracture length is significantly shorter than the entire propped fracture length. This type of stimulation has several inefficiencies. The amount of fracturing fluid and proppant pumped into the formation is enough to fracture and prop open a length of the formation much larger than the area from which reservoir inflow actually occurs (the effective fracture length). This relatively short length of effective fracture length verses total propped fracture length can be attributed to several issues including damage to the formation created by imbibition, clay swelling, gas coning, and reduction of formation material (shale) strength in the area of the formation near the fracture. Further inefficiency is evidenced by the fact that the volume of fracturing fluid recovered in this type of operation is proportional to the effective fracture volume which is indicative to the effective length and height of the fracture. Typical aqueous fracturing fluid volumes recovered as a percentage of the total fracturing fluid pump are in the 10-40% range for low permeability reservoirs.

Figure 12:
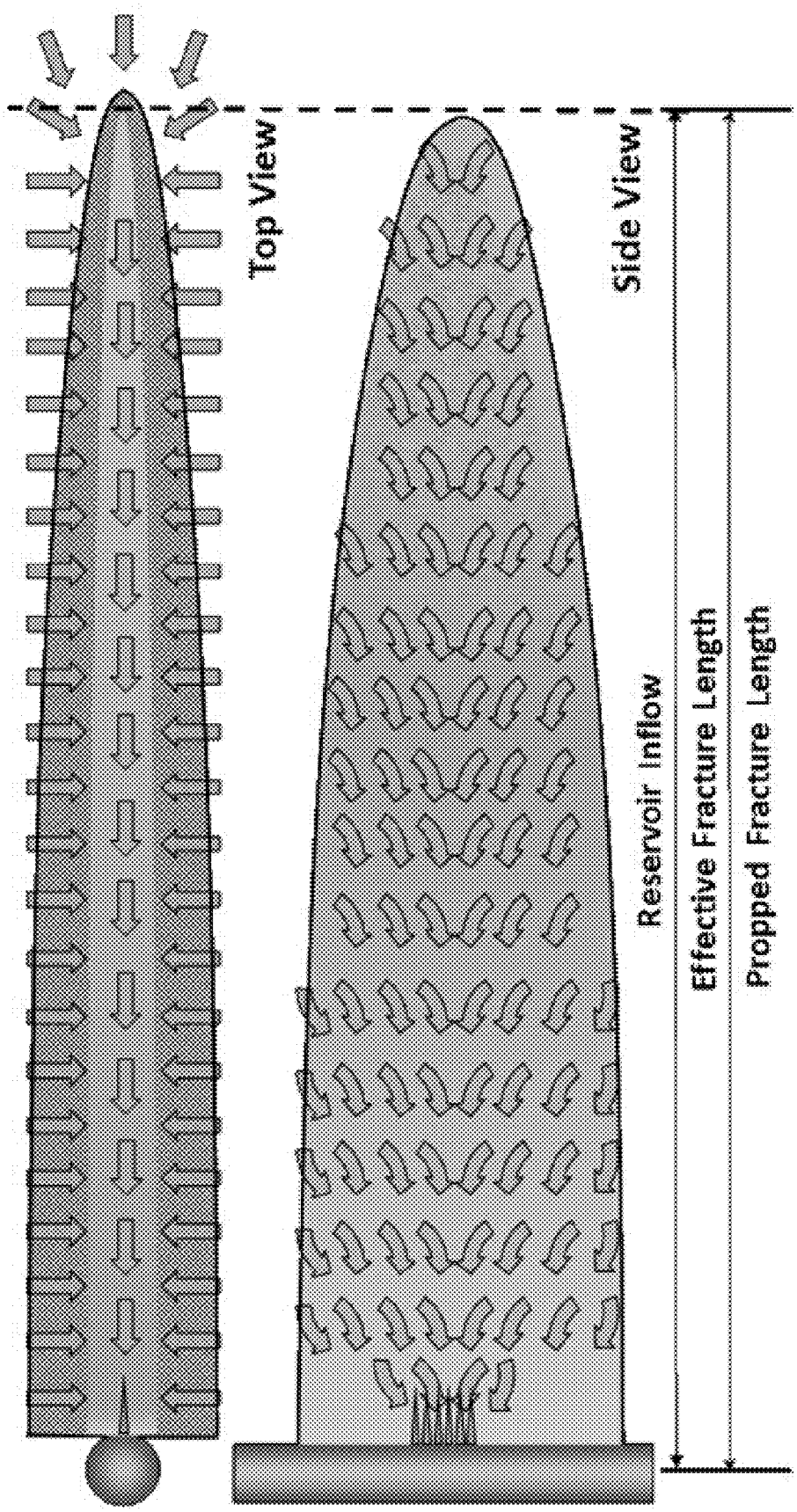
FIG. 12 depicts the effects of a fracture system caused through use of a gelled hydrocarbon based fracturing fluid, specifically gel propane.

In contrast to FIG. 11, FIG. 12 depicts a diagrammatic look at a fracture created through the use of a high vapor pressure hydrocarbon based fracturing fluid (specifically propane/LPG). In such a fracture the effective fracture length is substantially the same as the propped fracture length. This is in part due to the inherent increased mobility of the high vapor pressure hydrocarbon-based fracturing fluids when compared to aqueous fracturing fluids, but is also due to the miscibility of the hydrocarbon-based fracturing fluid with the formation fluids. In scenario depicted in FIG. 12 there is no damage created near the wellbore, fracture, or in the reservoir. Additionally, as discussed hereinabove, the recoverability of the fracturing fluid is proportional to the effective fracture volume, which is much greater in the FIG. 12, hydrocarbon-based fracturing fluid, example than it is in the FIG. 11, aqueous fracturing fluid, example. This combined with the high mobility of the high vapor pressure hydrocarbon-based fracturing fluids means that an operator will be able to recover a high percentage of the fracturing fluids that they initially injected into the formation to cause the fracturing. This recovered fluid may be reprocessed and reinjected into the same or another formation for additional stimulation.

Figure 13:
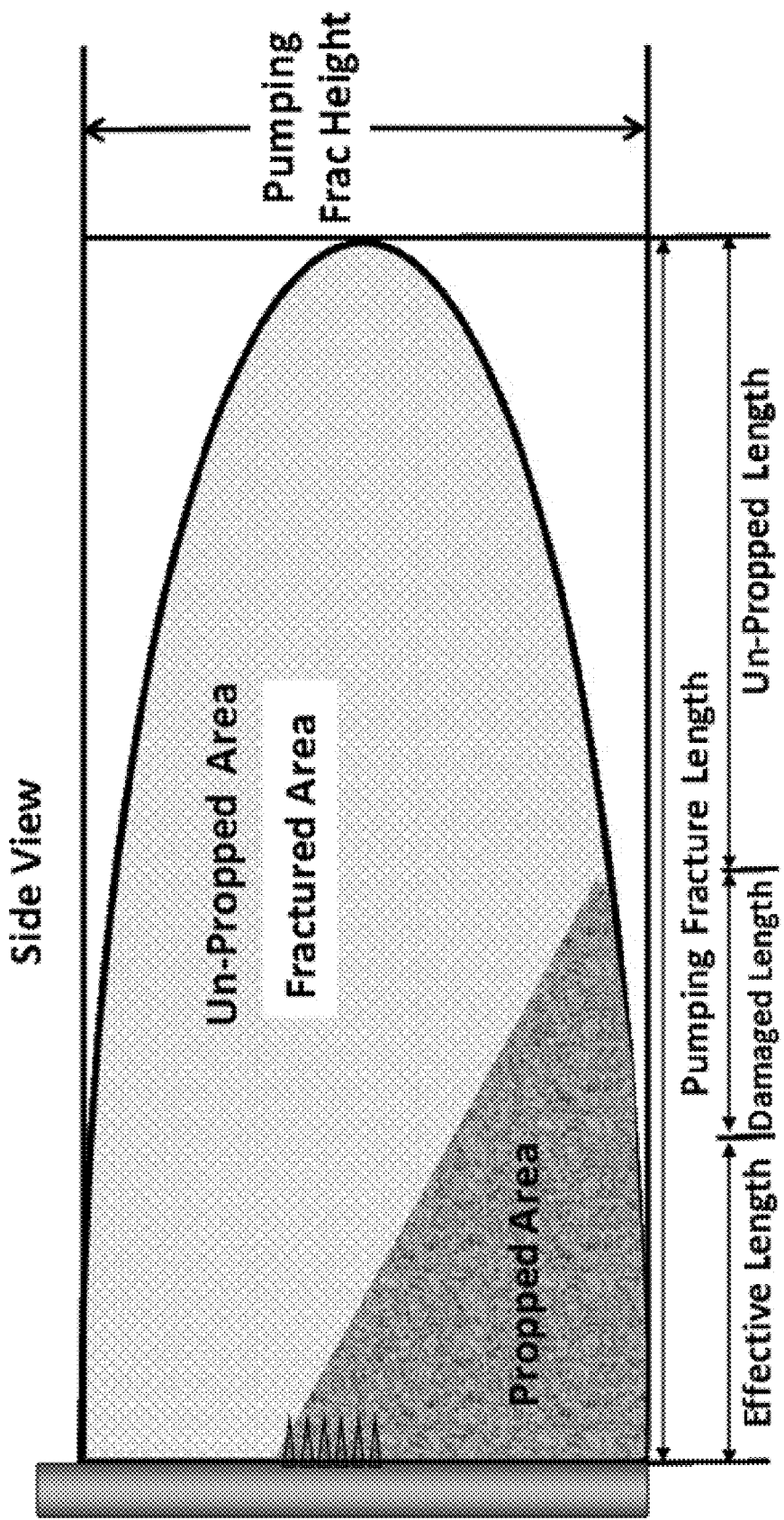
FIG. 13 depicts the effects of a fracture system caused through the use of a high vapor pressure hydrocarbon based fracturing fluid, specifically an LPG based fracturing fluid.

FIG. 13 depicts a diagram of a fracture having been created through the use of a gelled hydrocarbon fracturing fluid. In such a fracturing operation the gelled fluid fails to create an effective length of propped length equaled to the created fracture length in part due to the thermal thinning of the hydrocarbon fracturing fluid and its inability to transport proppant down the fracture length. An additional reduction to the effective frac length is due to residues that remain behind from the gellant agents used to viscosify the gelled hydrocarbon fracturing fluid. This type of fracturing system does provide high early production, but said production rapidly declines. It is an inefficient technique since short effective length of the fracture leads to low cumulative production in low permeability reservoirs.

Figure 14:
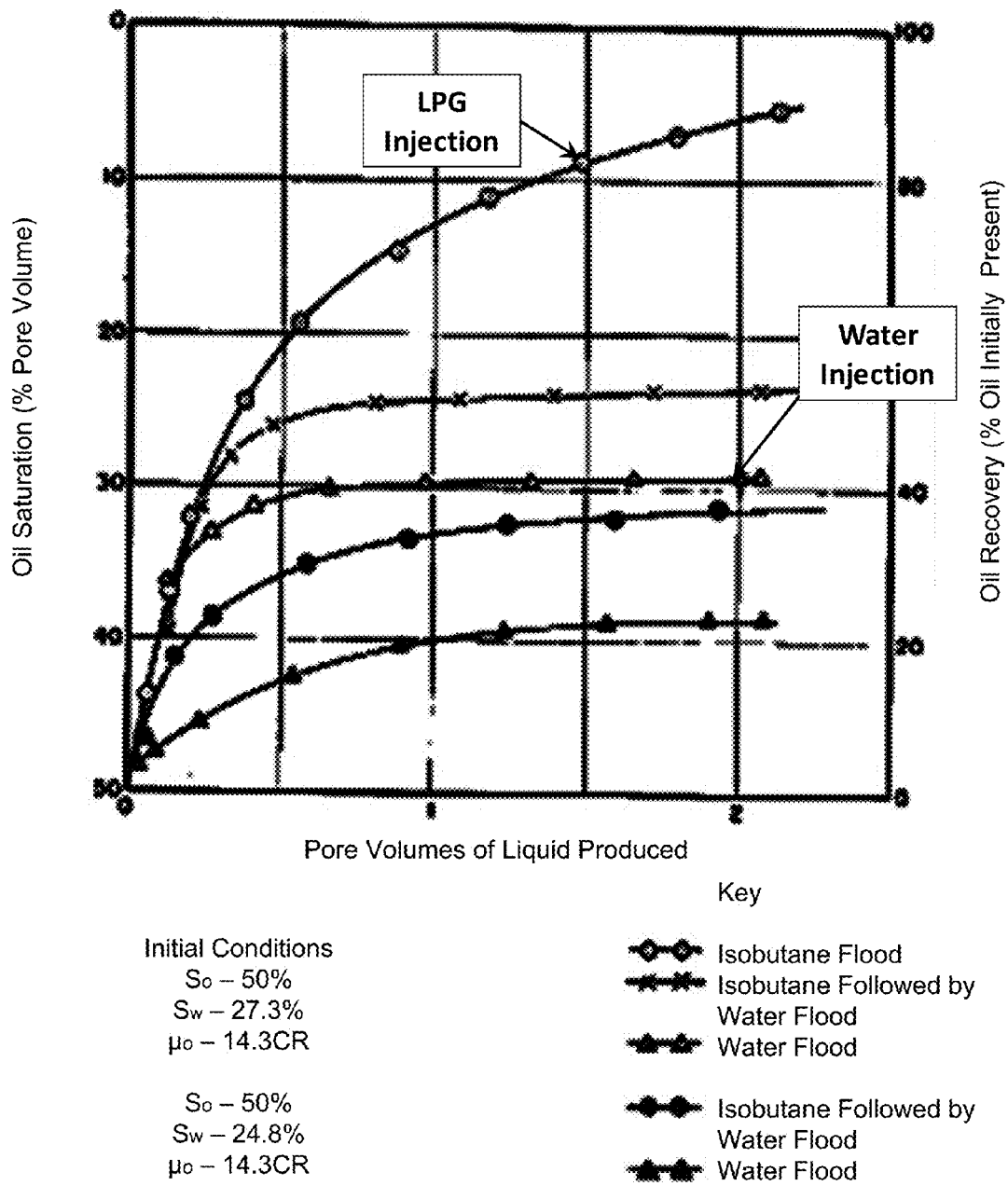
FIG. 14 depicts a chart illustrating the high recoverability of hydrocarbon based fracturing fluids compared to aqueous fracturing fluids.

FIG. 14 shows a graph depicting favorable results that can be achieved but injection LPG components into an oil reservoir. The chart shows that use of LPG can reach near 100% recovery while the use of water, provides for substantially smaller percentages of recovery. This result is driven by the miscible properties of LPG resulting in complete mixing with the native oils and therefore reducing the native oil's viscosity and surface tension allowing for the native oil to become mobile and to be recovered. This demonstrates the additional benefit of a high vapor pressure fracturing fluid (eg propane, isobutane, butane, etc.) in enhancing the flow characteristics of native oils when this fluid is used as the fracturing fluid in the fracture fluid recovery phase.

Figure 15:
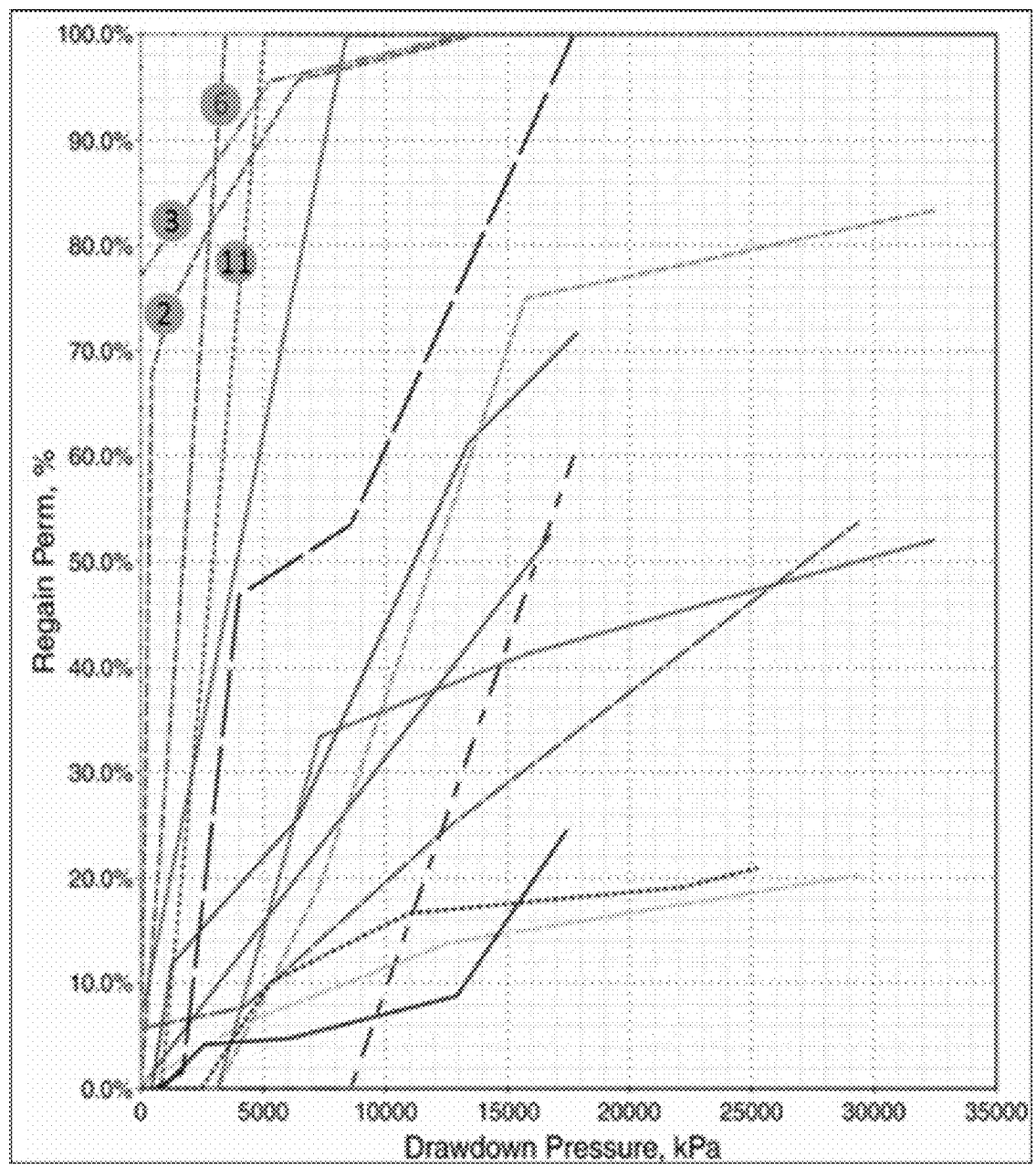
FIG. 15 depicts a chart illustrating the high regain permeability of high vapor pressure hydrocarbon based fracturing fluids at relatively low pressures.

FIG. 15 shows a graph of regain permeability by percent versus drawdown pressure in kPa. Included among others in the materials whose effects were tracked in the chart are LPG (#6), 95% N2 (#2), 50/50 light oil/CO2 (#3), and 80% N2 (#11). The graph indicates that LPG based fracturing fluid reaches 100% regain permeability at the lowest pressure of the materials tested. This again evidences the ability for high vapor pressure hydrocarbon-based fracturing fluids to be easily recovered after their use in stimulating a formation.

Figure 16:
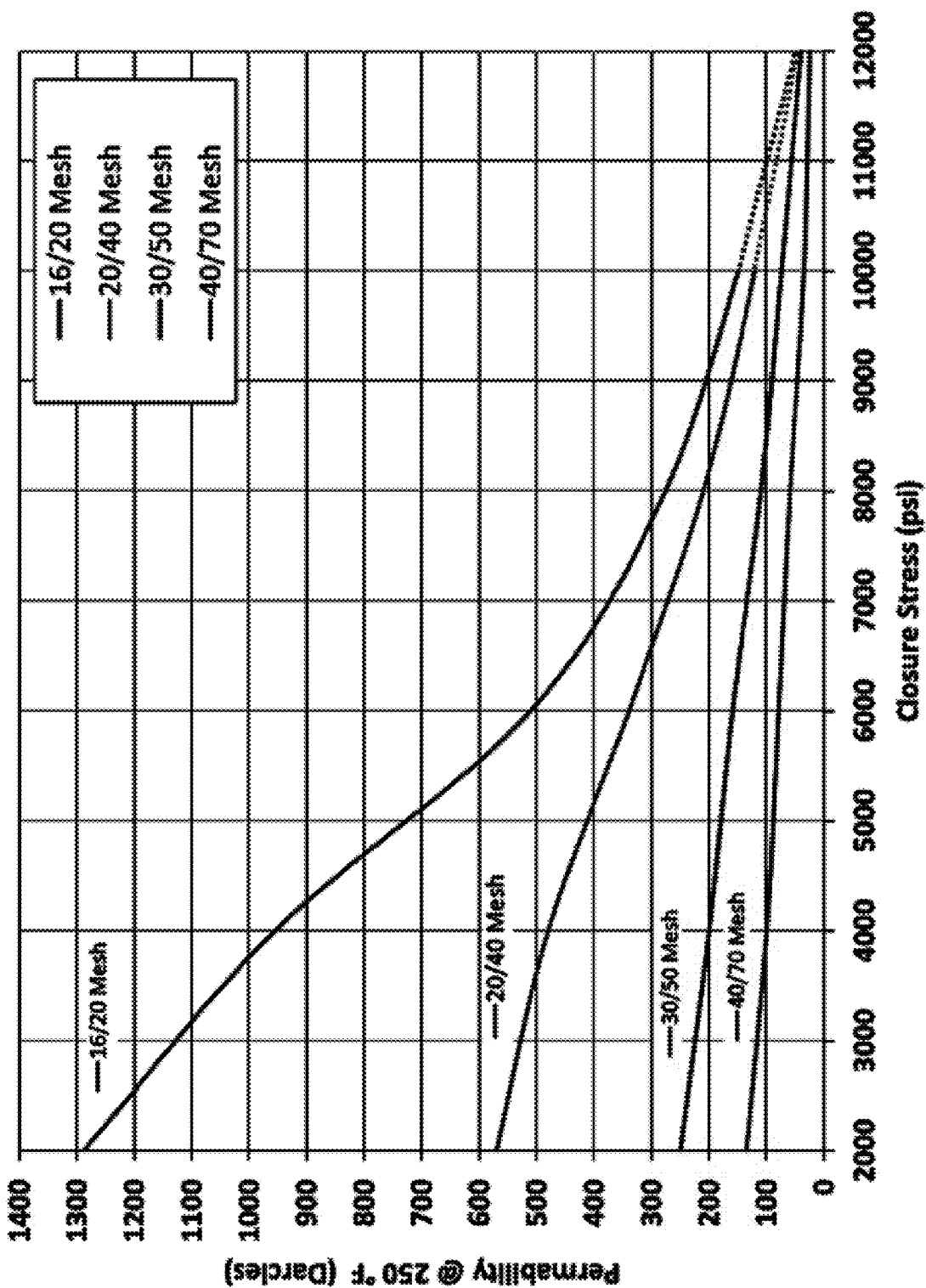
FIG. 16 depicts a chart showing conductivity cell testing, specifically showing the permeability changes as they relate to closure stress for proppants of various sizes.

FIG. 16 shows a graph depicting permeability of a proppant pack and how changes versus closure stress for proppants of various particle sizes. The smaller mesh sizes numbers (16/20) represent larger proppant diameters than the larger mesh size numbers (40/70) which represent smaller diameter proppants.

FIG. 16 illustrates that at lower stresses that are within the mechanical strength of the material the larger grain size 16/20 mesh provides greater permeability than the smaller grain size 40/70 mesh due to the pore throats between the grains having a larger crossectional area. However, as the stress increases there is a precipitous drop off in the permeability of the large grains (16/20) due to the failure of the material, the resultant fines migration of failed pieces, and subsequent tighter packing occurring. There is a significantly less magnitude of a drop off in permeability with the smaller grains. A major contributing factor is the smaller grains offering more points of contact and enabling the stress to be distributed among more grains per square inch than in the case of the larger grains. This greater distribution of the load allows for lower strength materials to with stand these higher loads without resulting in a significant drop in permeability of the proppant pack.

Figure 17:
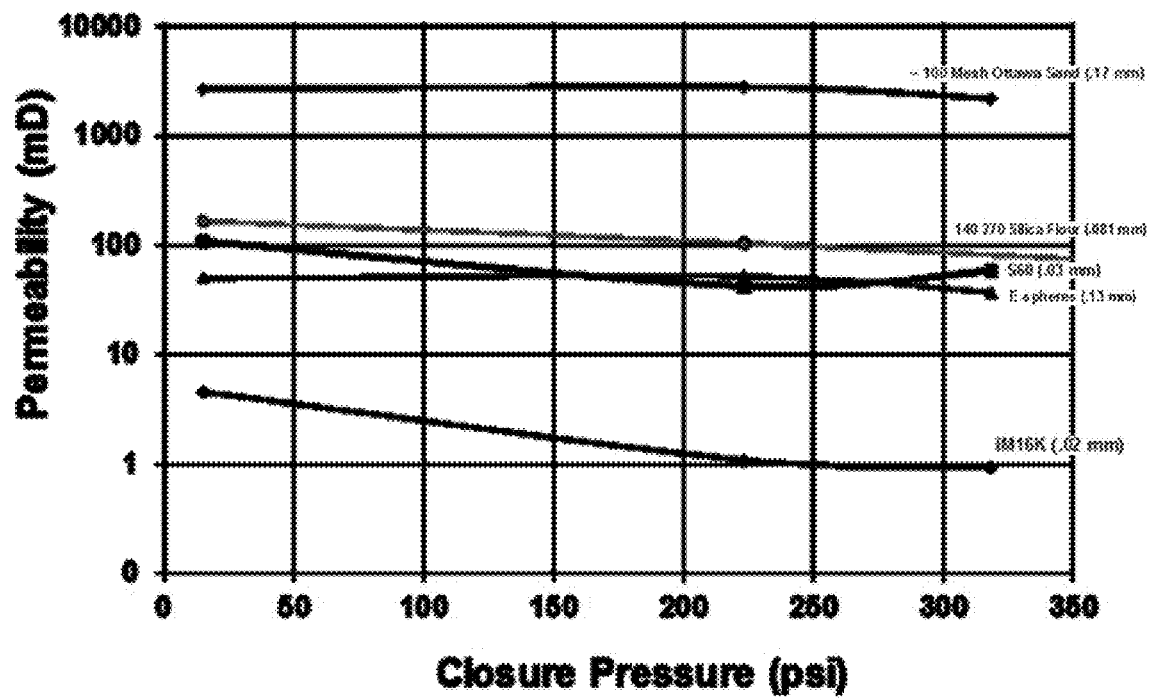
FIG. 17 depicts a chart showing the permeability changes as they relate to closure stress for different proppant materials.

FIG. 17 shows laboratory data of various proppant materials and sizes. Commonly used in the field of subterranean hydraulic fracturing is natural sand with a density of 2.65 g/cc. In FIG. 17, the 100 Mesh Ottawa Sand and 140-270 Silica Flour are both natural sand products with only the proppant diameter varying. The other proppants shown are light weight proppants (<1.0 g/cc) that are manmade. A system, or method, may include or utilize proppants that are safe for human ingestion which satisfy other criteria disclosed herein in relation to properties including, for example, density, buoyancy, strength, and particle size. There is a general trend expected as stress increases a decline in permeability is observed to the point when the material reaches its mechanical strength and then there is a drastic reduction in permeability. It is also understood the proppant materials being used in FIG. 17 that the strength of materials is proportional to the density of the material thus making the natural sand proppants the strongest material. FIG. 17 illustrates that the lower strength low density proppants is compensated by their smaller grains thus creating more grains per unit area and distributing the load over more individual grains resulting in a smaller load per grain over the stresses shown in FIG. 17.

Figure 18:
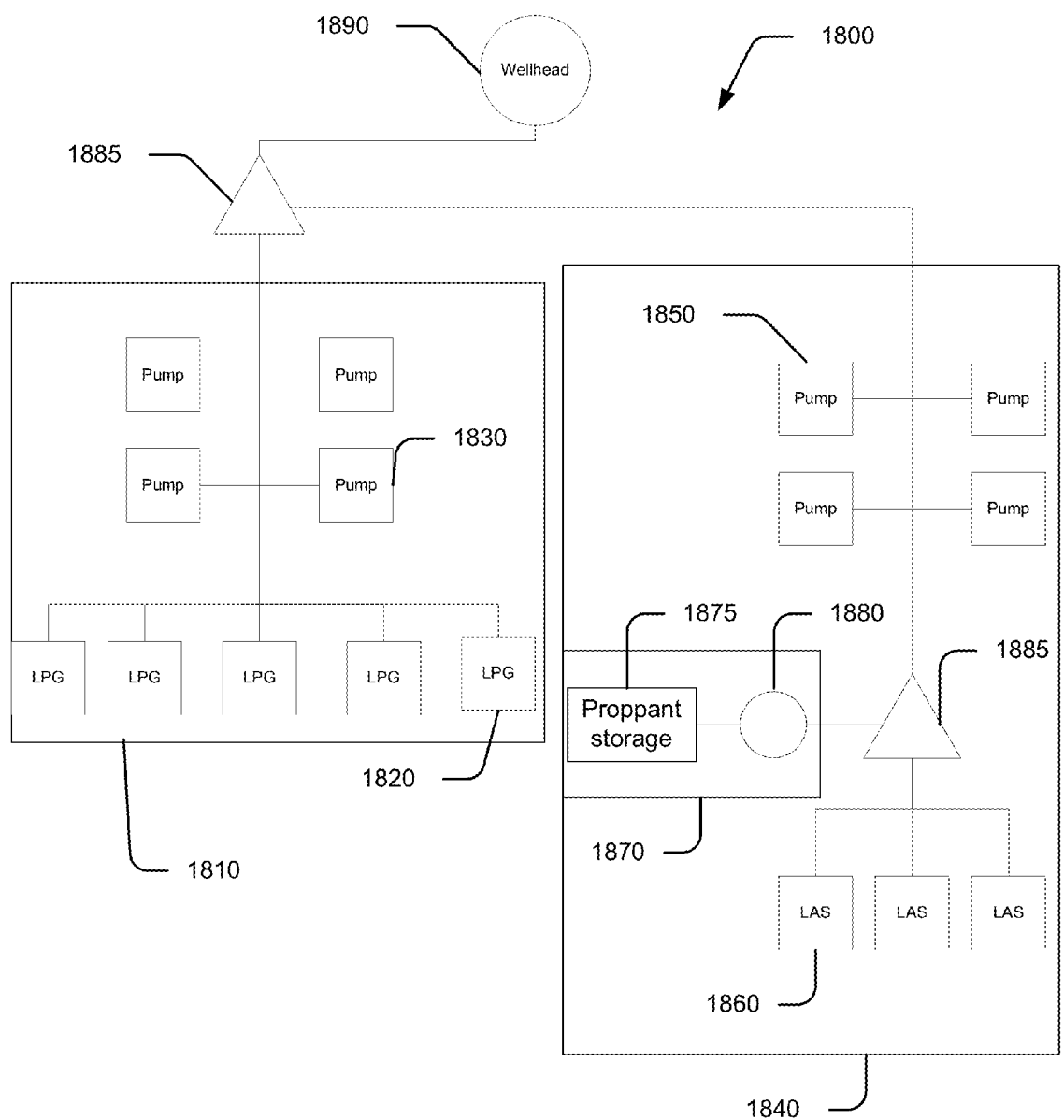
FIG. 18 depicts and exemplary embodiment of a split-spread fracturing system layout.

FIG. 18 depicts an exemplary split-spread fracturing system 1800. The exemplary system depicted comprises, a first medium addition subsystem 1810 comprising a plurality of first medium storage containers 1820 are connected to a plurality of pumps 1830 for pressurizing the first medium to flow said first medium into the formation. The system further includes a second medium addition subsystem 1840 comprising a plurality of pumps 1850 and a plurality of carrier medium storage containers 1860 are connected to a proppant addition system 1870. Also connected to the proppant addition system 1870 is the proppant storage vessel 1875 and, if necessary, a proppant pump/lubricant adding system 1880. Both the first medium addition subsystem 1810 and the second medium addition subsystem 1840 are connected to a medium mixing system 1885 at a point at or prior to the wellhead 1890. The first medium addition subsystem 1810 being configured to retain and transport high vapor pressure hydrocarbon-based fracturing fluids to the formation at pressures sufficient to stimulate the formation. The second medium addition subsystem 1840 configured to transport low vapor pressure hydrocarbon-based fracturing fluids, mixed with proppant, to the formation at pressure sufficient to stimulate the formation.

The first medium addition subsystem 1810 will require the use of pressure vessels and pumps configured to receive pre-pressurized fluids.

The low vapor pressure hydrocarbon-based fracturing fluids being pumped through the second medium addition subsystem 1840 will be capable of transporting proppant more effectively and with less damage to the system 1800 than if the second medium addition subsystem 1840 were dealing with high vapor pressure materials. This is due to the higher viscosities of the lower vapor pressure materials.

The proppant addition system 1870 is configured to allow for an operator to vary the amount of proppant being added per unit volume of the carrier medium. Similarly, the medium mixing system 1840 is configured to allow the operator to vary the amount of the first medium relative to the amount of the second medium that is introduced to the formation. These controls allow the operator to tailor the end fracturing fluid being pumped into the formation to the formation itself and the effects the operator desires inducing in the formation.

Figure 19:
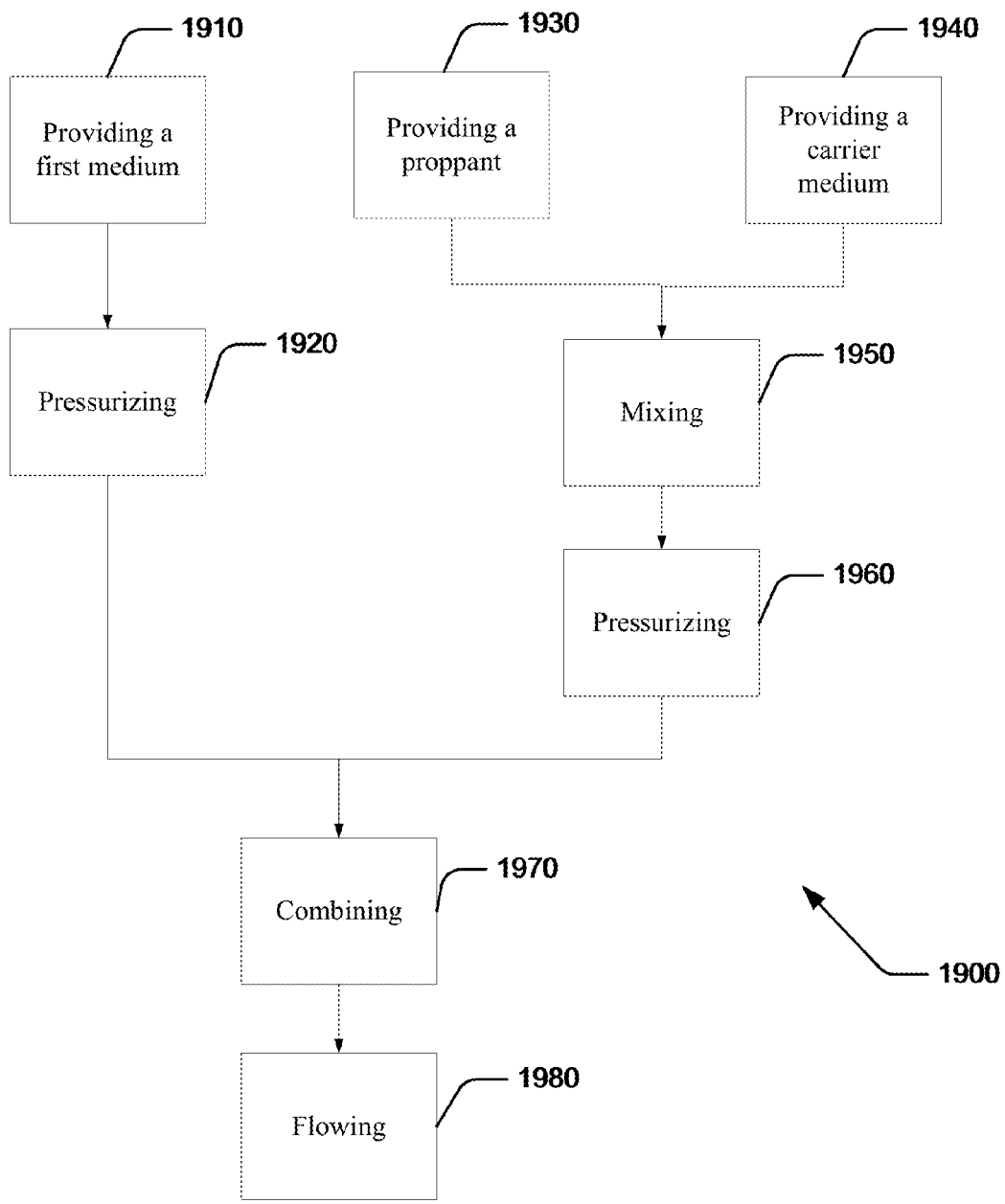
FIG. 19 depicts and exemplary embodiment of a method for fracturing a formation using a split-spread system.

FIG. 19 illustrates aspects of a split-spread fracturing method 1900. It will be understood that method 1900 may be practiced using the split-spread fracturing system 1800 or other suitable equipment. Method 1900 includes providing 1910 a first medium from a first medium addition subsystem. Method 1900 includes pressurizing 1920 the first medium, such as by operation of a pump, to flow said first medium into the formation. Method 1900 includes providing 1930 a proppant. Providing 1930 may be performed by a proppant addition system. Method 1900 may include providing 1940 a carrier medium. Method 1900 may include mixing 1950 the carrier medium and proppant to form a second medium. In an embodiment mixing 1950 may occur without pressurizing the carrier medium. Method 1900 may include pressurizing 1960 the mixture of the carrier medium and proppant. Method 1900 may include combining the first medium with the second medium. Method 1900 may include flowing 1980 the mixture of the first and second mediums to the formation under pressure sufficient to stimulate the formation.

While various embodiments usable within the scope of the present disclosure have been described with emphasis, it should be understood that within the scope of the appended claims, the present invention can be practiced other than as specifically described herein.

What is claimed is:

1. A fracturing system for hydraulic stimulation of a subterranean formation, the system comprising:
   a well having a wellhead and a downhole portion in fluid communication with the wellhead;
   a first medium addition subsystem comprising: a first medium storage vessel retaining a first medium pressurized to a first pressure, said first medium comprising high vapor pressure hydrocarbon compounds; a first motor; and a pressurized first pump; wherein the first motor is configured to drive the first pump to pressurize the first medium to a second pressure, the second pressure higher than the first pressure, to flow said first medium into the subterranean formation through the wellhead;
   a second medium addition subsystem comprising: a carrier medium storage vessel retaining a carrier medium comprising low vapor pressure hydrocarbon compounds that are liquid at atmospheric conditions, and that have a higher viscosity than the high vapor pressure hydrocarbons, a second motor, a second pump, a proppant storage vessel, and a proppant addition system configured to enable variance in the amount of a proppant added to the carrier medium per unit of volume of the carrier medium; wherein the carrier medium and the proppant from the proppant storage vessel are configured to mix together to form a second medium, and wherein the second motor is configured to drive the second pump to pressurize the second medium to the second pressure to flow said second medium into the subterranean formation through the wellhead,
   wherein the proppant comprises at least one of the group consisting of: glass spheres, glass bubbles, cenospheres, microspheres, aerogel, resin-coated aerogel, resin-coated pumice, and syntactic foam;
   wherein the proppant has a specific gravity of less than or equal to 1.1 relative to the carrier medium;
   wherein the first and second motors are each electric motors;
   wherein the first and second medium addition subsystems each further comprise a variable frequency drive configured to provide electrical power to the respective electric motors; and
   a medium mixing system located between the first and second medium addition subsystems and the pipeline, the medium mixing mechanism configured to enable variance in a flow rate of at least one of the first medium and the second medium to the well.

2. The system of claim 1 wherein the high vapor pressure hydrocarbon compounds comprise at least one of the group consisting of:

alkanes with a carbon number of 6 or less;
wherein the low vapor pressure hydrocarbon compounds comprise at least one of the group consisting of: mineral oil and alkanes with a carbon number between 9 and 20.

3. The system of claim 1, wherein the first medium further comprises a fluorosurfactant.

4. The system of claim 1, wherein the first medium comprises a hydrocarbon and a quantity of an inert gas sufficient to foam the hydrocarbon.

5. The system of claim 1, wherein the first medium comprises a halogenated hydrocarbon.

6. The system of claim 1, wherein the first medium comprises a non-gelled liquid alkane.

7. The system of claim 1, wherein the proppant comprises particles having a diameter of less than or equal to 105 microns.

\* \* \* \* \*